(12) United States Patent
Froeschle et al.

(10) Patent No.: US 7,252,053 B2
(45) Date of Patent: Aug. 7, 2007

(54) ELECTROMAGNETIC ACTUATOR AND CONTROL

(75) Inventors: Thomas A. Froeschle, Southborough, MA (US); Roger Mark, Barrington, RI (US); Thomas C. Schroeder, Southboro, MA (US); Richard Tucker Carlmark, Cumberland, RI (US); David E. Hanson, Upton, MA (US); Jun Ma, Northborough, MA (US); Benjamin G. K. Peterson, West Boylston, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 11/438,041

(22) Filed: May 19, 2006

(65) Prior Publication Data

US 2006/0213467 A1    Sep. 28, 2006

Related U.S. Application Data

(63) Continuation of application No. 10/810,538, filed on Mar. 26, 2004, now Pat. No. 7,128,032.

(51) Int. Cl.
    *F01L 9/04*    (2006.01)
(52) U.S. Cl. ............... 123/90.11; 251/129.01
(58) Field of Classification Search ......... 123/90.11, 123/90.12, 90.13; 251/129.01, 129.02, 129.15, 251/129.16, 129.18
    See application file for complete search history.

(56) References Cited

U.S. PATENT DOCUMENTS

| | | | |
|---|---|---|---|
| 1,676,591 A | 7/1928 | Welller | |
| 4,009,695 A | 3/1977 | Ule | |
| 4,364,336 A | 12/1982 | Skala | |
| 4,462,348 A | 7/1984 | Giardini | |
| 4,602,174 A | 7/1986 | Redlich et al. | |
| 4,623,808 A | 11/1986 | Beale et al. | |
| 4,703,297 A | 10/1987 | Nagasaka | |
| 4,827,163 A | 5/1989 | Bhate et al. | |
| 5,036,802 A | 8/1991 | D'Amours | |
| 5,074,263 A | 12/1991 | Emerson | |
| 5,124,598 A | 6/1992 | Kawamura | |
| 5,135,025 A | 8/1992 | Mackal | |
| 5,287,829 A * | 2/1994 | Rose | 123/90.12 |
| 5,687,682 A | 11/1997 | Rembold et al. | |
| 6,039,014 A | 3/2000 | Hoppie | |
| 6,098,585 A | 8/2000 | Brehob et al. | |
| 6,125,808 A | 10/2000 | Timewell | |
| 6,237,546 B1 | 5/2001 | Gander | |

(Continued)

FOREIGN PATENT DOCUMENTS

DE    19714496    10/1998

(Continued)

*Primary Examiner*—Ching Chang
(74) *Attorney, Agent, or Firm*—Fish & Richardson P.C.

(57) ABSTRACT

An electromagnetic actuator includes a stator assembly mounted to a center pole formed of material having high magnetic permeability and functions as a return path for the magnetic field generated when current is passed through coils in the stator assembly. When current is applied to one or more coils within the stator assembly, a magnetic field is generated that interacts with a magnetic field generated by one or more magnets disposed within the armature assembly and causes the armature to move relative to the center pole thus, for example, opening or closing a valve.

2 Claims, 18 Drawing Sheets

U.S. PATENT DOCUMENTS

| | | |
|---|---|---|
| 6,318,312 B1 | 11/2001 | Bauer et al. |
| 6,373,678 B1 | 4/2002 | Bartsch et al. |
| 6,679,204 B2 | 1/2004 | Iida et al. |
| 6,755,161 B2 | 6/2004 | Grundl et al. |
| 6,845,762 B2 | 1/2005 | Modien |
| 2002/0008601 A1 | 1/2002 | Yajima et al. |
| 2002/0175570 A1 | 11/2002 | Redlich |
| 2004/0012270 A1 | 1/2004 | Kwon et al. |

FOREIGN PATENT DOCUMENTS

| | | |
|---|---|---|
| EP | 0954086 | 11/1999 |
| EP | 1089418 | 4/2001 |
| WO | WO 93/04278 | 3/1993 |

\* cited by examiner

ELECTROMAGNETIC ACTUATOR AND CONTROL

CLAIM OF PRIORITY

This application is a continuation and claims priority of application Ser. No. 10/810,538 of Thomas A. Froeschle, Roger Mark, Thomas C. Schroeder, Richard Tucker Carlmark, David E. Hanson, Jun Ma, and Benjamin G. K. Peterson entitled ELECTROMAGNETIC ACTUATOR AND CONTROL, which was filed on Mar. 26, 2004, now U.S. Pat. No. 7,128,032 and is incorporated here by reference.

TECHNICAL FIELD

This disclosure relates to electromagnetic actuators.

BACKGROUND

An internal combustion engine typically includes a number of cylinders that each has a set of valves that open and close to allow fuel and air into the cylinder and release exhaust from the cylinder. Typically, the valves of an internal combustion engine are controlled mechanically with, for example, a cam shaft.

SUMMARY

In one aspect, the invention features an electromagnetic actuator that includes a center pole having a longitudinal axis and formed of a material having high magnetic permeability (e.g., a ferromagnetic or paramagnetic material). Coupled to the center pole is a stator assembly that has an inner surface that defines an opening. A coiled conductor is disposed near the inner surface of the stator assembly and is configured to generate a first magnetic field when current is applied. The actuator also includes an armature assembly at least partially disposed within the stator assembly opening. A permanent magnet is disposed within the armature assembly and moves in a direction parallel to a longitudinal axis of the center pole when current is applied to the coiled conductor assembly. One advantage of having a center pole formed of material having high magnetic permeability is that it allows the actuator achieves a greater force output than a actuator with the same magnetic circuit without the center pole. Another advantage is that the center pole also reduces the air gap of the flux loop for the magnetic circuit, thereby resulting in a more efficient magnetic circuit than one without such a center pole.

Various embodiments may include one or more of the following features.

The center pole may be formed of a plurality of segments. The center pole also may act as a bearing surface for the armature assembly and may be coated with a low-friction coating.

The permanent magnet of the armature assembly may be ring-shaped and radially magnetized and may be oriented such that the longitudinal axis defined by the ring of the magnet is parallel (or coaxial) with the longitudinal axis of the center pole. The permanent magnet of the armature assembly may be split in the axial direction or formed of multiple segments (e.g., multiple arc-shaped segments) to interrupt the dominant eddy current path of the magnet.

The armature assembly may also include a valve stem that is adapted to open or close a valve when current is applied to the coiled conductor. The center pole may define a channel in which a valve stem is at least partially disposed, thereby acting as a guide for the valve stem. The valve stem may be coupled to the remainder of the armature assembly such that the valve stem has freedom of movement in directions perpendicular to the longitudinal axis of the center pole and/or freedom of to rotate around the longitudinal axis of the center pole. The valve stem may have a ball-shaped tip formed at one end that fits into a ball cage attached to the armature assembly such that the valve stem is secured to the remainder of the armature assembly in a direction parallel to the longitudinal axis of the center pole.

The stator assembly may include a plurality of coils that are configured such that adjacent coils generate magnetic fields of opposite polarity. For example, the plurality of coils may be connected in series and may be wound such that adjacent coils are wound in opposite directions. Alternatively, adjacent coils may be wound in the same direction and configured to receive current with opposite relative polarity. The armature assembly may also include corresponding number of permanent magnets that are arranged such that adjacent permanent magnets have opposite polarity. Spacers may be disposed between each of the permanent magnets and the magnets and/or spacers may be split in the axial direction to interrupt dominant eddy current paths.

The stator assembly may also include one or more back iron members formed of a material having high magnetic permeability, and the inner surface of the stator assembly is coated with a dielectric material.

The actuator may employ an overhung magnet design in which the axial height of a magnet (i.e., the height of the magnet as measured relative to the longitudinal axis of the center pole) is greater than the axial height of a corresponding coiled conductor in the stator assembly. Similarly, the actuator may employ an underhung magnet design in which the axial height of a magnet is less than the axial height of a corresponding coiled conductor in the stator assembly.

The actuator may be configured such that the force of the armature as a function of displacement of the armature relative to the stator assembly is substantially constant over an intended range of excursion. The actuator may be configured such that the detent force profile of the actuator as a function of displacement of the armature relative to the stator assembly is substantially zero over an intended excursion range of displacement.

The actuator may be configured to form part of a cooling circuit and may include a cooling jacket that is disposed at least partially around the stator assembly and circulates cooling fluid. The center pole may also include one or more channels that are configured to circulate cooling fluid.

The actuator may be configured to open and close a valve and a controller may be electrically connected to the actuator to control the operation of the actuator. The controller may be configured to receive information about one or more operating states of the valve (e.g., valve velocity, acceleration, and/or position) and apply a control signal to the coil(s) based on the received information to generate a magnetic field that causes the armature assembly to move relative to the longitudinal axis of the center pole. The controller may receive information about both the velocity and position of the valve and selectively apply a velocity feedback control and a position feedback control to position the valve.

In another aspect, the invention features a method for controlling an electromagnetic valve actuator having a stator that defines a longitudinal axis and an armature disposed within the stator that includes receiving information about velocity and position of the valve and applying a control signal to the actuator by selectively activating a velocity feedback loop and a position servo feedback loop to position the valve to a desired position.

Various embodiments may include one or more of the following features. The velocity feedback loop may function to reduce the valve velocity. The desired position of the valve may be where the valve is fully open or fully closed. The method may also include activating the velocity feedback loop to compensate for detent force at a given armature displacement.

In another aspect, the invention features an internal combustion engine that includes a cylinder that defines a chamber, a valve adapted to control the flow of a liquid or a gas into or out of the chamber, and an electromagnetic actuator coupled to the valve to control operation of the valve. The actuator includes a stator assembly having an inner surface that defines an opening and a coiled conductor disposed near the inner surface and a center pole formed of a material having high magnetic permeability (e.g., paramagnetic or ferromagnetic material) and defining a longitudinal axis. The actuator also includes an armature assembly at least partially disposed within the stator assembly opening and moves in a direction parallel to a longitudinal axis of the center pole when current is applied to the coiled conductor assembly.

Various embodiments may include one or more of the following features. The internal combustion engine may also include a controller configured to receive information about one or more operating states of the valve (e.g., valve velocity, acceleration, and/or position) and apply a control signal based on the received information to the coil to generate a magnetic field that causes the armature assembly to move relative to the longitudinal axis of the center pole. The controller may receive information about both the velocity and position of the valve and selectively applies a velocity feedback control and a position feedback control to position the valve.

The internal combustion engine may further comprise a cooling circuit that includes a heat exchanger and a pump that circulates cooling fluid between the electromagnetic actuator and the heat exchanger. The electromagnetic actuator may also includes a cooling jacket disposed at least partially around the stator assembly and having one or more channels that circulate cooling fluid between the electromagnetic actuator and the heat exchanger. The electromagnetic actuator may also include one or more channels within the center pole that circulate cooling fluid between the electromagnetic actuator and the heat exchanger.

An electromagnetic actuator designed in accordance with the teachings of this disclosure may be employed in an internal combustion engine to variably and independently control the engine's intake and exhaust valves. One advantage of using an actuator in an engine is that is permits an engine to start without the need of a secondary motor (e.g., a starter motor). Another advantage of using such an actuator in an engine is that it may improve engine emissions by stopping the engine when it would otherwise be idling (e.g., while a vehicle is stopped at a traffic light).

While the electromagnetic actuators described below are described in the context of an internal combustion engine, it should be understood that the teachings of this disclosure are not meant to be limited to valve control in an engine, but rather may be applied to a wide variety of applications.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1B:
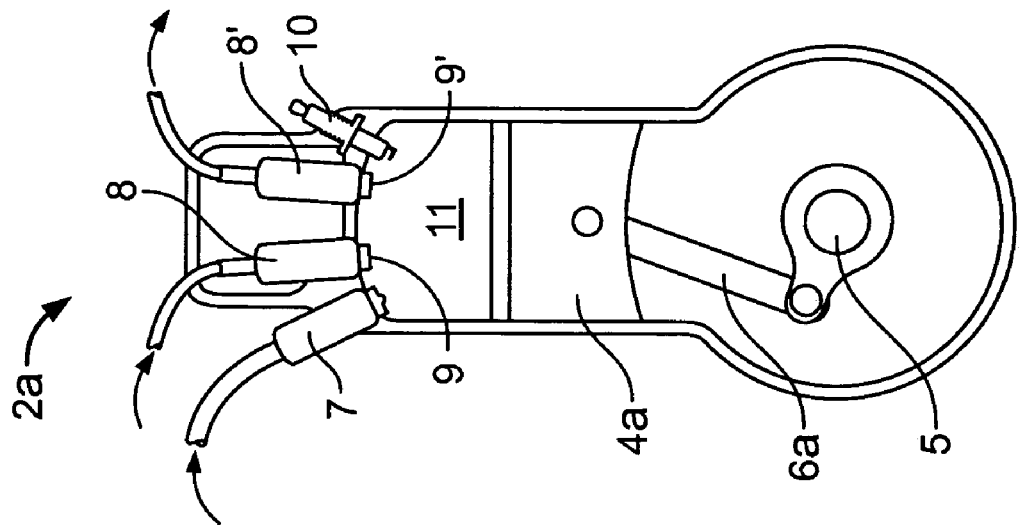
FIG. 1B is a diagram of a chamber in an internal combustion engine.
Figure 1A:
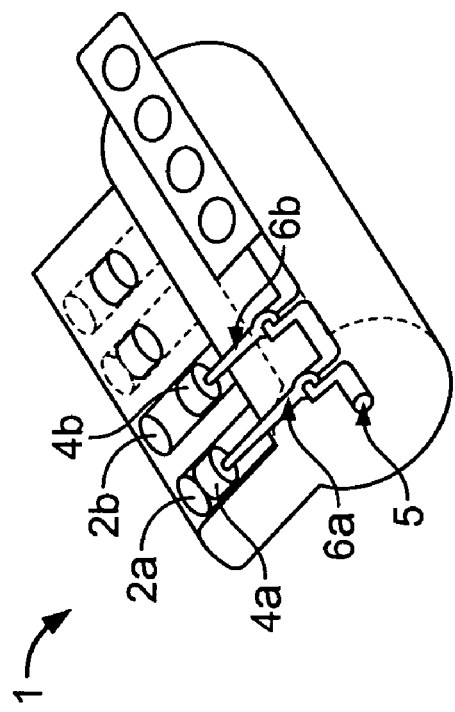
FIG. 1A is a diagram of an internal combustion engine.

As shown in FIG. 1A, an internal combustion engine 1 includes a number of cylinders, e.g., 2a-2b, that each houses a piston, e.g., 4a-4b. Each of the pistons, in turn, is mechanically connected to crankshaft 5 with a rod, e.g., 6a-6b. Each cylinder, e.g., cylinder 2a, as shown in FIG. 1B, includes an intake valve 9, exhaust valve 9', spark plug 7, and fuel injector element 10 each disposed at least partially within a chamber 11 of the cylinder. A control unit (not shown) controls the intake and exhaust valves 9', 9 by controlling intake valve actuator 8 and exhaust valve actuator 8', respectively. The control unit also commands the fuel injector to inject a suitable amount of fuel-air mixture into the chamber 11, ignites the fuel-air mixture at the appropriate time with spark plug 7, and then vents the exhaust from the combustion of the fuel-air mixture through exhaust valve associated with valve actuator 8. The control unit may control the operation of the valves, fuel delivery and spark plug ignition in accordance with the methods described in a patent application titled "Controlled Starting and Braking of an Internal Combustion Engine" by David Hanson, Jun Ma, Benjamin G. K. Peterson, and Geoffrey Coolidge Chick, filed concurrently with this application, which is fully incorporated by reference.

Figure 2B:
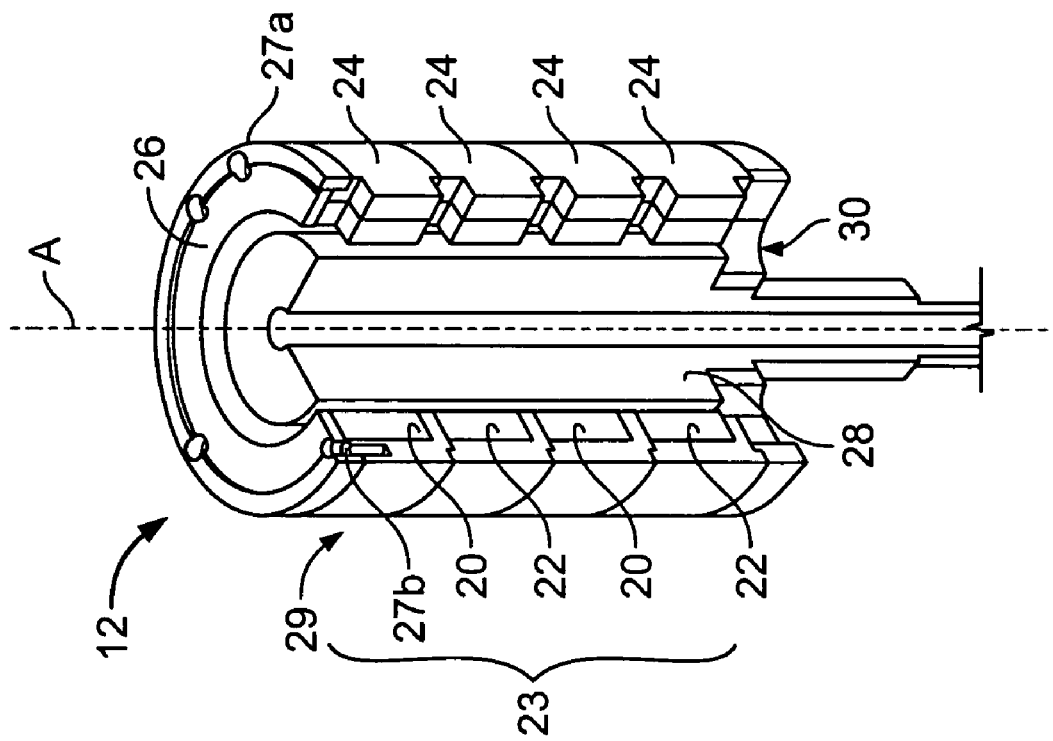
FIGS. 2A-2H are diagrams of an electromagnetic actuator.
Figure 2A:
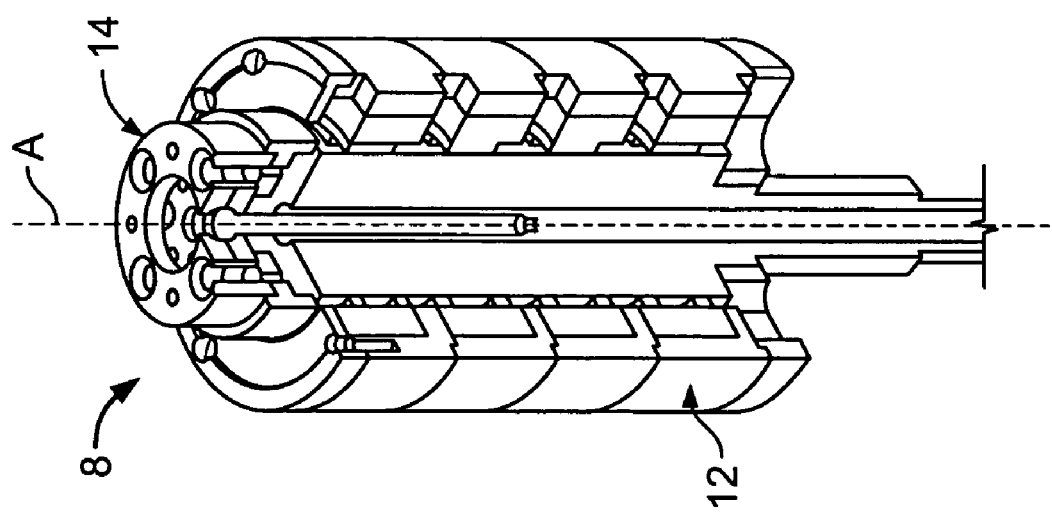

Each valve actuator, e.g., valve actuator 8 shown in FIG. 2A, includes an armature assembly 14 disposed within a stator assembly 12. Upon actuation, the armature assembly 14 slides along the longitudinal axis A of the stator assembly 12 to open (or close) a valve (not shown in FIG. 2A).

As shown in FIG. 2B, the stator assembly 12 includes an outer housing 29 that is mounted to a center pole 28. The center pole 28 is a hollow, tube-like structure that extends beyond the outer housing 29 and acts as a guide for a valve stem (shown in FIGS. 2G-2H) attached to the armature assembly. In addition to acting as a guide for the valve stem, the center pole is formed of a material having high magnetic permeability and provides a magnetic return path for the magnetic field generated when current is passed through the coil conductor assembly 23. A coupling flange 30 mechanically couples the center pole 28 and outer housing 29.

The outer housing 29 includes a coil conductor assembly 23 surrounded by interlocking back iron members 24. A series of screws, e.g., 27a-27b, through a cap 26 secures the interlocking back iron members in place. In this particular implementation, the coil conductor assembly 23 includes two pairs of round copper wire coils 20 and 22 that are wound in opposite directions (e.g., coils 20 are wound clockwise and coil 22 are wound counter-clockwise, or visa versa) and connected in series such that when a current from a single drive circuit is applied to the coils, the coils produce magnetic fields of opposite polarity. In other words, one pair of coils (e.g., coils pair 20) will produce a magnetic field of one polarity and the second pair of coils (e.g., coil pair 22) will produce a magnetic field of the opposite polarity when a current is applied to the coils. The two pairs of coils are alternately arranged within the stator assembly such that the coils that form a pair (e.g., coil pair 20) are not adjacent to one another. As will be explained in more detail below, the alternatively wound coils 20, 22 are aligned with magnets of alternating relative polarity in the armature. When current is applied to the coils 20, 22, a magnetic field is formed between the outer housing and the center pole which causes the magnetized armature to slide along the longitudinal axis A of the actuator. The alternating polarity of neighboring coils and magnets work as magnetic flux return paths for each other.

In another implementation, all of the coils of the coil conductor assembly are wound in the same direction and are supplied with separate current signals of alternating polarity to produce a series of alternating magnetic fields. Other implementations may employ one or more coils that produce magnetic fields of opposite polarities or of the same polarity. The coils 20, 22 may be constructed from a conductor (e.g., wire or conductive tape) having a variety of cross sectional shapes such as circular, elliptical, rectangular or square.

Figures 2C, 2D:
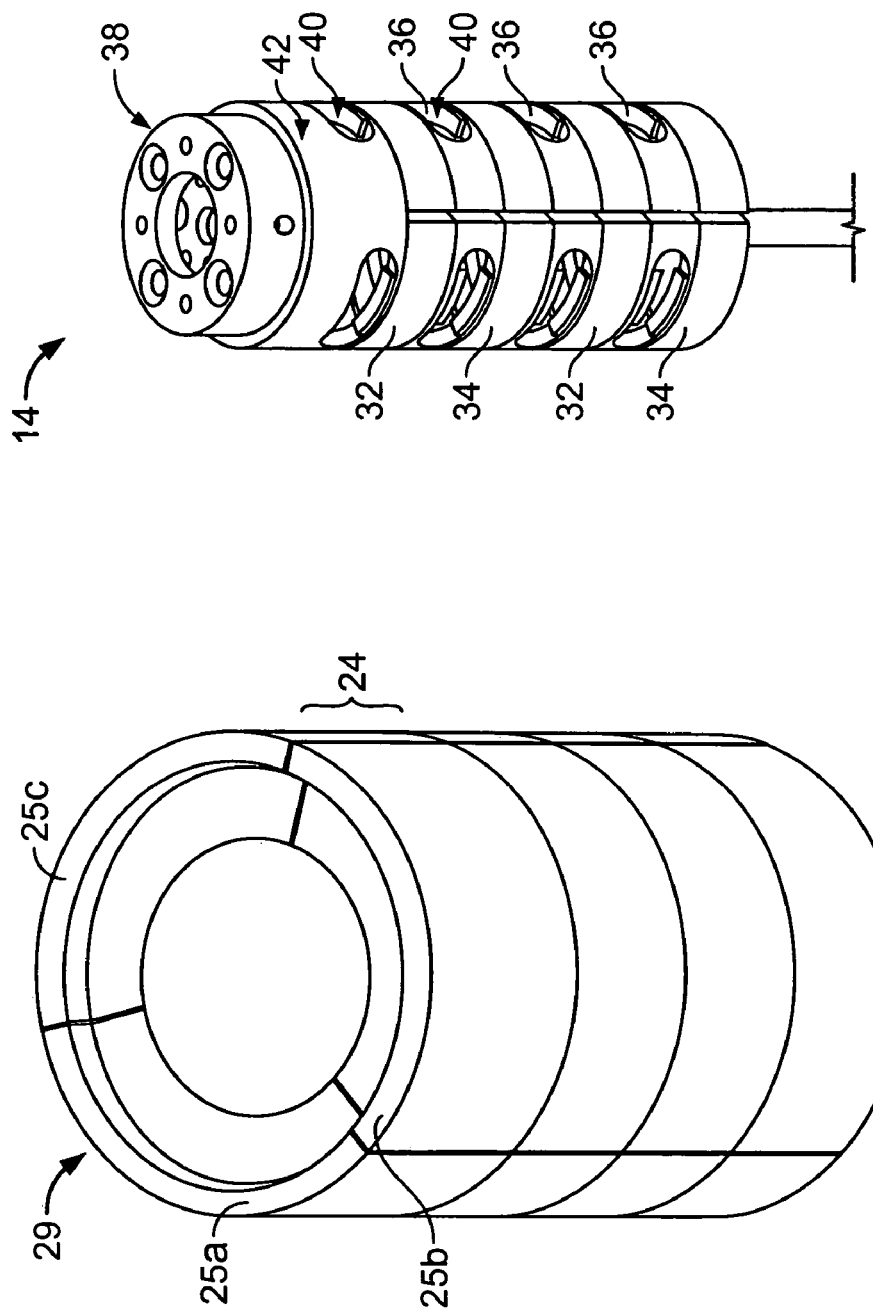

As shown in FIG. 2C, each back iron member 24 is comprised of three circumferential segments 25a-25c. The use of separate circumferential segments allows for radial thermal expansion of the copper coils as electrical power is applied thus reducing the risk of fracture of the back iron members 24. The back iron members 24 directs the magnetic field produced by the electrical conductors towards the armature assembly, while the center pole 28 advantageously serves as a return path for the magnetic circuit generated when current is passed through the coils. By having a center pole act as a magnetic return path for the magnetic circuit, the actuator achieves a greater force output than a actuator with the same magnetic circuit without the center pole. The center pole also reduces the air gap of the flux loop for the magnetic circuit, resulting in a more efficient magnetic circuit than one without such a center pole. In order for the center pole 28 to act as a magnetic return path, it should be formed of a material having high magnetic permeability, such as ferromagnetic or paramagnetic material.

Ferrous elements of the stator assembly 12, including the center pole 28 and back iron members 24, are preferably constructed of materials having high magnetic permeability and high magnetic saturation characteristics. It is also preferable to use materials that have high electrical resistivity in order to reduce the dynamic losses of the ferrous elements. Materials such as silicon iron alloys or soft magnetic composites provide high magnetic permeability and saturation characteristics and are also highly resistive and may be used to form the center pole 28 or other ferrous elements of the actuator.

In a preferred implementation, the back iron members 24 and center pole 28 are formed of a powdered metal Soft Magnetic Composite (SMC) material (such as SM2 or SM3 made by Mii Technologies, LLC, headquartered at West Lebanon, N.H., or Somaloy™ 500 made by Hoganas, headquartered at Hoganas, Sweden), which has a combination of high electrical resistivity and high magnetic permeability.

The center pole 28 may be formed as a single piece construction (as shown in FIG. 2B) or it may be compositely formed from a number of segments of homogeneous or heterogeneous material. Forming the center pole 28 from discrete segments will increase the electrical resistivity of the center pole 28 over a single-piece construction and lower its susceptibility to eddy currents.

The coupling flange 30, which provides a mechanical connection between the stator and center pole, and the cap 26, which secures the back iron members in place, are preferably made a non-magnetic, resistive material with lower susceptibility to eddy currents such as austenitic stainless steel.

The stator assembly is preferably coated with a potting epoxy or other high strength, high dielectric adhesive material, which helps to both secure the coils within the stator assembly, protect the coils from physical wear and provide electrical insulation to the back iron members 24. The potting epoxy may be applied via an assisted impregnation process, in which the actuator and surrounding fixtures are placed in a vacuum environment with the potting epoxy introduced via an inlet tube with an overflow tube to indicate a completed fill.

In another implementation, the inner surfaces of the back iron members are coated with a dielectric material to provide electrical insulation for the actuator. One technique for coating the inner surfaces of these parts is to first electro coat the surfaces with approximately 0.001 inches of dielectric paint followed by a coat of approximately 0.002-0.004 inches of epoxy-based powder-coat. This technique provides redundant protection against voltage breakdown between coils and the structures that the coils may come into contact. In addition to coating the inner surfaces of the back iron members, the entire inner surface of the stator assembly may be coated with a high dielectric strength potting epoxy or film material, such as a thin Kapton® polyimide film (made by DuPont High Performance Materials headquartered in Circleville, Ohio) bonded to the surface. This layer of material provides electrical insulation between the outer surface of the armature assembly and the inner surface of the stator assembly and also serves as a physical barrier between the inner surface of the stator assembly 12 and any cooling fluid, such as engine oil, to which it may be exposed.

In addition, the center pole is also preferably coated with a low friction protective coating, such as an electroless nickel coating, to improve the bearing and wear qualities of the armature and stator assembly as the armature slides along the center pole during use.

Figure 2F:
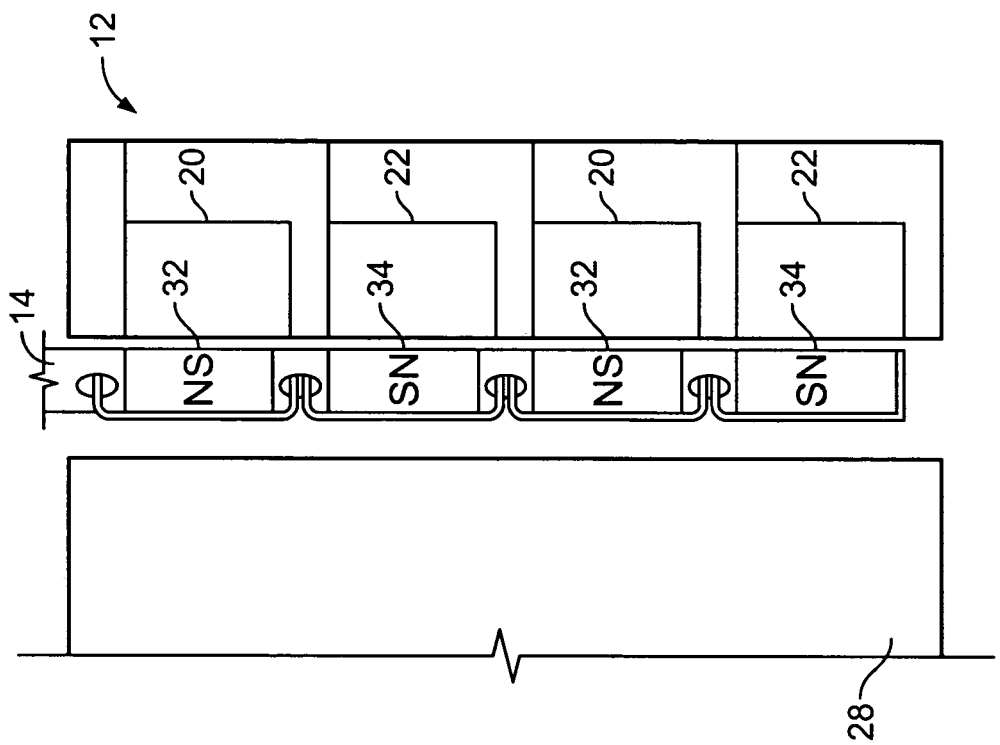
Figure 2E:
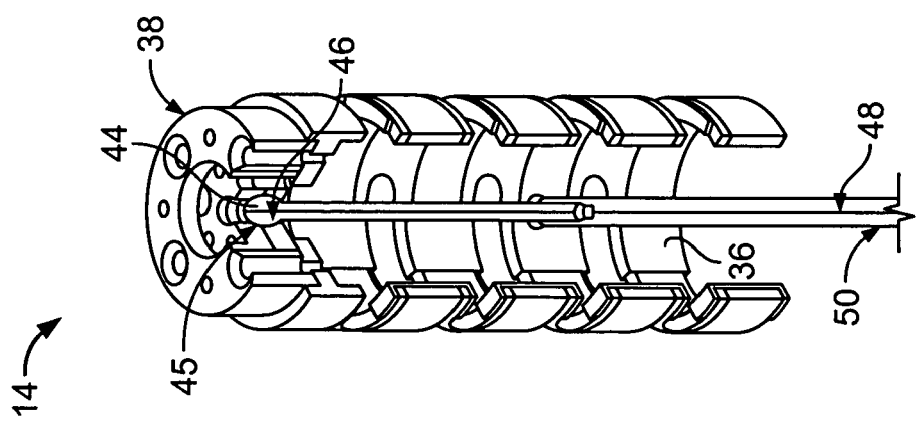

Referring to FIGS. 2D-2F, the armature assembly 14 includes two pairs of permanent magnets 32, 34, that are radially magnetized, that is the magnets have a first polarity along the inner circumference of the magnet and a second polarity along their outer circumference. In one implementation, as shown in FIG. 2F, one pair of magnets have a south-north polarity (e.g., magnet pair 32) while the second pair has a north-south polarity (e.g., magnet pair 34). Like the pairs of coils in the stator assembly 12, the two pairs of magnets are alternatively arranged within the armature assembly 14 such that the magnets that form a pair (e.g., magnet pair 34) are not adjacent to one another. While the radial cross-section of the magnets is shown as having a circular cross-section in the exemplary design, other implementations may use magnets having other cross-sectional shapes.

Referring to FIG. 2D, the armature assembly 14 includes magnet spacers 36 interposed between adjacent magnets and a series of clips 40 that couple adjacent spacers 36 thus securing the magnets 32, 34 in place. The magnetic spacers 36 are preferably formed of a high modulus, low density material having a high resistivity, such as titanium. In this implementation, the clips 40 provide a bearing surface for the inner diameter of the armature assembly and may be coated with a low friction coating, such as diamond-like carbon (DLC) coating. In another implementation, the inner and outer diameters of the spacers may extend slightly beyond the inner and outer diameters of the magnets in order bear the frictional load during operation. In this implementation, the bearing surfaces of the spacers are preferably coated with a low friction coating (e.g., DLC, molybdenum disulfide).

Each of the magnets 32, 34 and the spacers 36 are split in the axial direction to interrupt the dominant eddy current path which helps to reduce dynamic losses. Other implementations may use magnets and/or spacers that are formed of multiple arc segments, which creates multiple discontinuities in the dominant eddy current path for each element. Although four magnets and coils are shown, other implementations may employ various numbers and combinations, both in arrangement and magnetization, of these parts.

The armature assembly 14 also includes a ball joint assembly 38 and a coupler 42 that couples the valve stem assembly 50 to the remainder of the armature assembly 14. A number of clips 40 attach the coupler 42 to the rest of the armature assembly 14. The clips 40 may be further adhered to the spacers 36 and to coupler 42 using an adhesive, such as an epoxy-based adhesive.

Referring to FIG. 2E, the ball joint assembly 38 includes a ball cage 45 and a valve stem assembly 50, which includes an upper stem 46 and a lower stem 48. One end of the upper stem 46 has a ball shape 44 while the other end has a male thread (not shown). The ball shape end of the upper stem 46 fits into the ball cage 45, and the male threaded end of the upper stem 46 threads into a mating female thread in the lower stem 48. The ball joint assembly 38 functions to couple the armature 14 to the valve stem 50 in the axial direction but leaves other directions, such as the two other translational directions and the three rotations, uncoupled. Other implementations may use other mechanical assemblies to couple the valve stem to the remainder of the armature assembly in which some directions are coupled and other directions are uncoupled to avoid overconstraining the mechanical assembly.

Using permanent magnets paired with the coils and ferrous elements of the stator assembly 12, the two magnetic sources operate to move the armature assembly 14 in a linear motion within the stator. As discussed before, similar to the coil conductor assembly, the radially magnetized adjacent magnets are oppositely polarized. Other elements of the armature are non-motion producing, and serve to create axial spacing of the magnets as well as provide mechanical coupling between the magnets and the valve stem. The axial spacing of the magnets and coils depend on the intended excursion of the design and the desired positional relationship between the axial height of the coil and magnet. In general, the top and bottom of each magnet will stay within the axial location (defined as the distance of the coil, measured in the axial direction, from the bottom to the top of the coil) of its mating coil and back iron material at the extreme ends of travel for the most constant force output over that excursion.

Figure 2G:
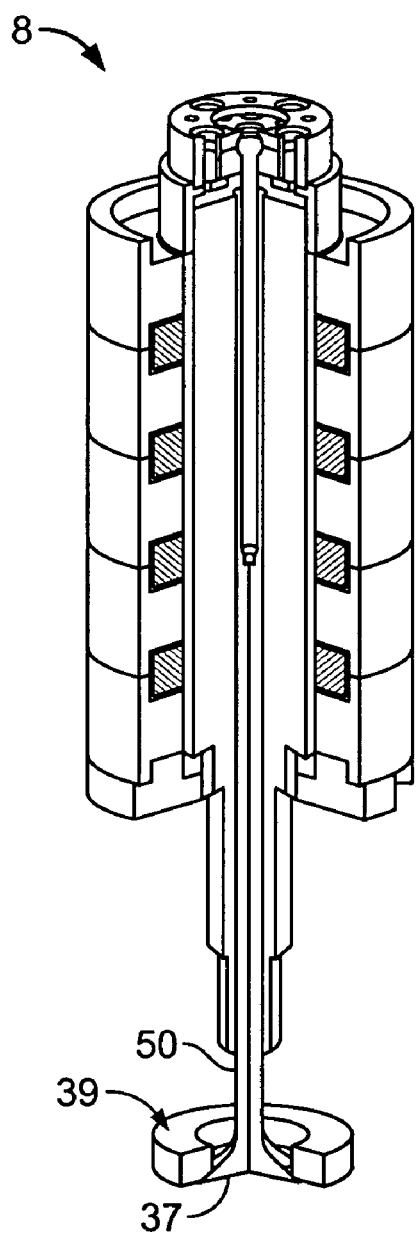
Figure 2H:
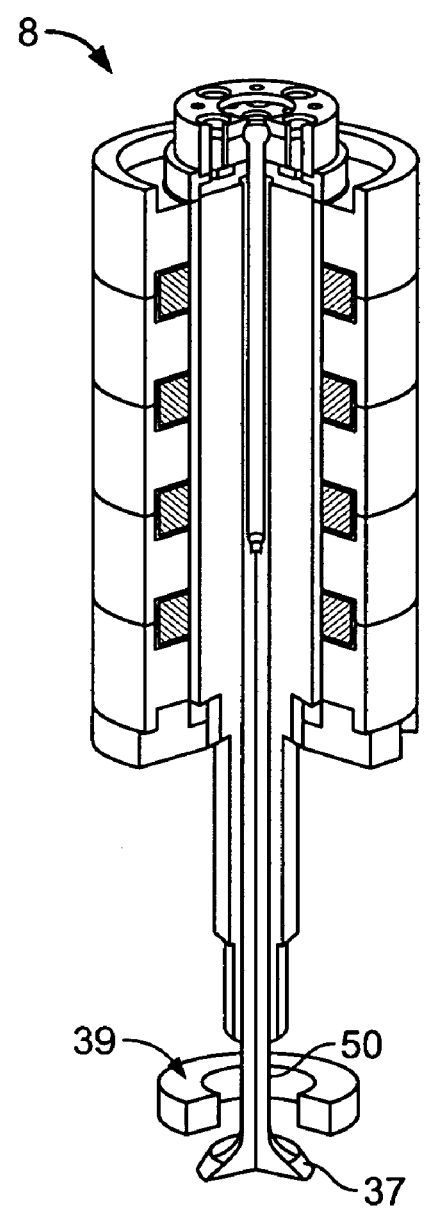

When current is applied to the coils of the stator assembly 20, 22, the magnetic field produced by the coils causes the armature assembly 14 to move, in an upward or downward direction (relative to FIG. 2A). As an example, if the armature magnets have a polarity as indicated in FIG. 2F and current flows in a clockwise direction through coils 20 and in a counter-clockwise direction through coils 22, the armature assembly 14 will move in a downward direction. Referring to FIG. 2H, as the armature assembly 14 moves downward, the valve stem 50 pushes the valve 37 to a fully opened position. Similarly, as shown in FIG. 2G, when current is reversed, the armature assembly 14 is pulled upwards, causing the valve stem to pull the valve against the valve seat 39, thus closing the valve.

The slide of the armature assembly 14 against the center pole 28 provides a substantial thermal path to the magnets 32, 34 which may lead to demagnetization. Thus, the choice of material for the magnets 32,34 is a balance between the desire for a high energy product to provide higher actuator force output and the stability of the magnetic properties. In a preferred implementation, neodymium-iron-boron magnets are selected for their energy density and ability to be radially magnetized. High coercive force characteristics are important for the stability of the material in the presence of demagnetizing influences such as externally applied magnetic fields and high temperatures. Other embodiments may use magnets formed of a permanent magnet material composition incorporating a rare earth metal, such as Neodymium or Samarium Cobalt. Examples of other suitable materials include Nd35s, Nd38s, Nd42s and Nd30s, made by Hitachi Magnetics Corporation, headquartered at Edmore, Mich.

In addition to heat generated by friction, eddy currents induced by the rapid changes in magnetic flux density generate additional heat energy. As previously mentioned, the center pole and back iron members may be formed of a number of arc-shaped segments, which interrupt the dominant eddy current path. Also, selection of materials having both high magnetic permeability and high electrical resistivity, such as SMC or Somaloy 500 material, can be used to form the center pole and back iron members in order to further reduce dynamic losses. In addition to these techniques, an actuator may also include a cooling system to actively cool the actuator during use.

Figure 3A:
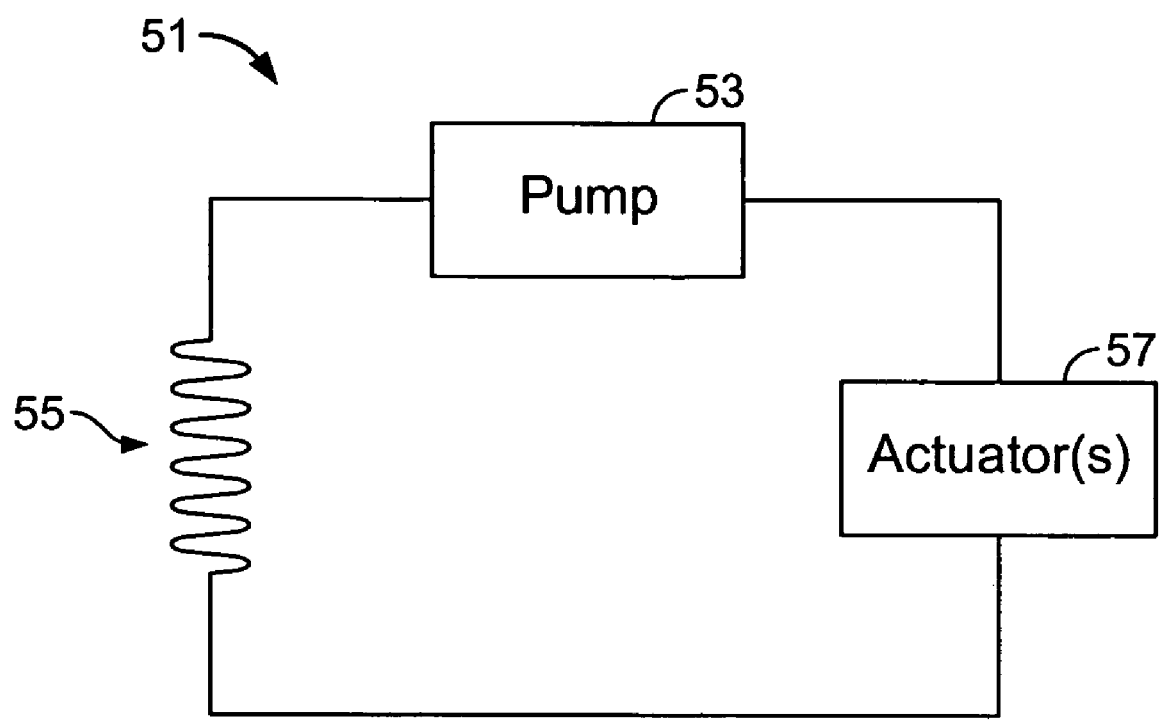
FIG. 3A is a diagram of a cooling circuit for an electromagnetic actuator.
Figure 3B:
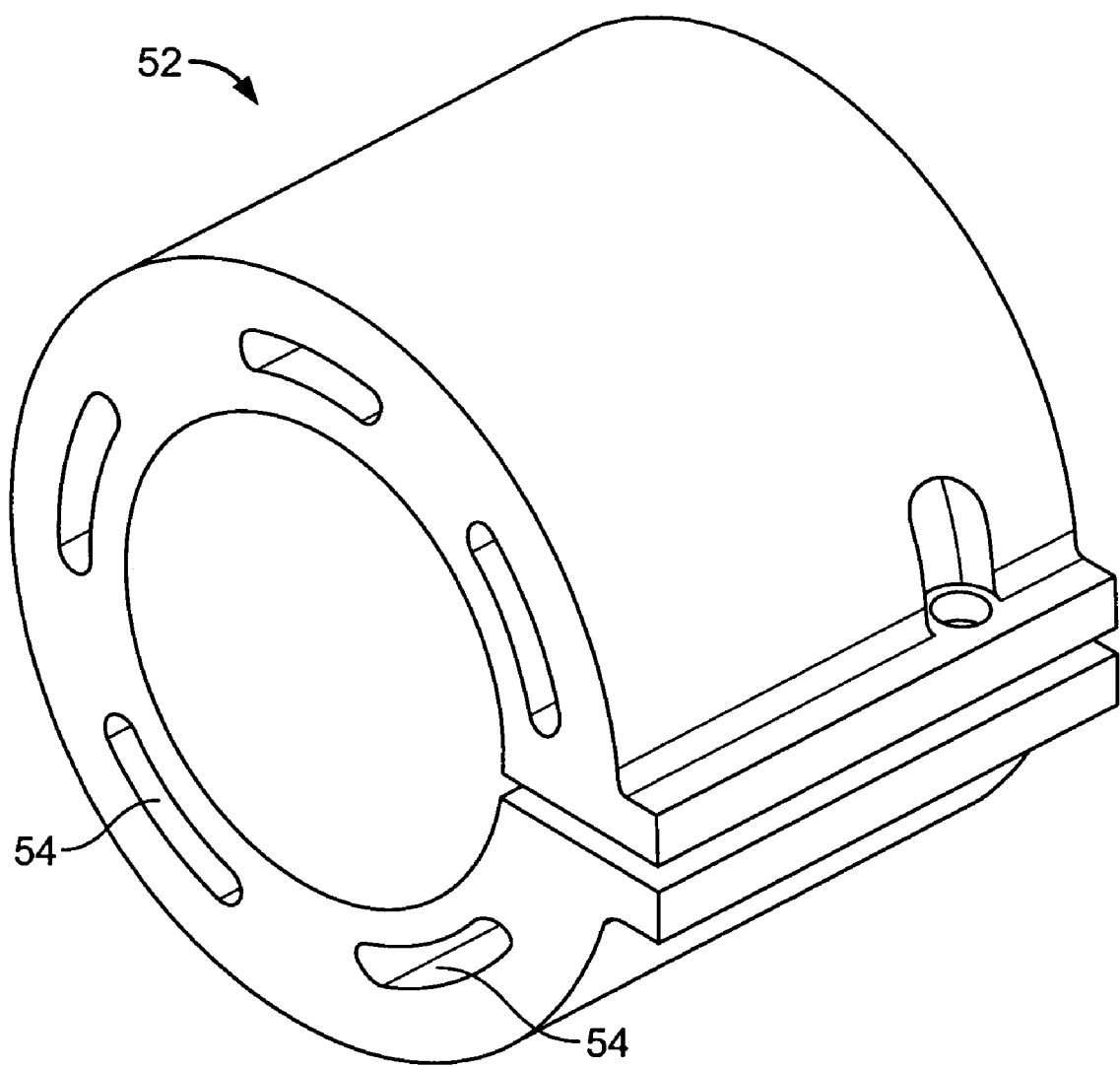
FIG. 3B is a diagram of a cooling jacket for an electromagnetic actuator.

For example, as shown in FIG. 3A, a cooling system 51 includes a pump 53 that circulates cooling fluid, such as water, 50/50 ethylene glycol/water mix, engine oil or other cooling fluid, between a heat exchanger 55 and one or more actuators 57 to transfer heat away from the actuator(s). One technique for circulating cooling fluid within an actuator is by placing a cooling jacket, such as cooling jacket 52 shown in FIG. 3B, around the outer surface of the stator assembly (not shown) to form part of the cooling circuit. A material having high thermal conductivity, such as thermal grease, potting compound with high thermal conductivity, thermally conductive elastomers or thermally conductive adhesive tapes, may be used to eliminate air gaps between the cooling jacket 52 and the stator assembly. The cooling jacket 52 may be connected to pump 51 and heat exchanger 55 to form a cooling circuit.

Other implementations may use other known cooling systems, such as a heat pump, to remove heat from the actuator. In a vehicle application, air flow arising from motion of the vehicle may be directed over the actuators to provide forced convection cooling. Auxiliary fans could also be used.

Figure 3C:
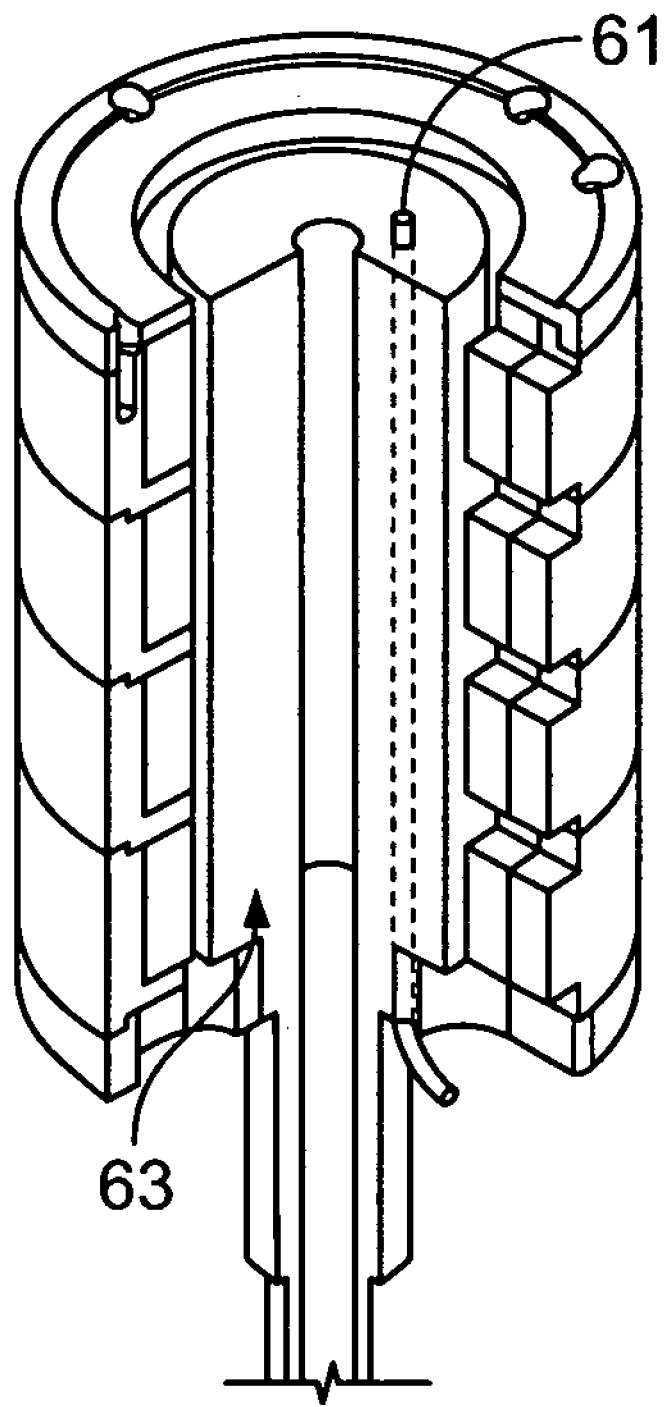
FIG. 3C is a diagram of a actuator with a cooling conduit through the center pole.

A cooling circuit may also be formed within the center pole of an actuator. For example, as shown in FIG. 3C, a thin-walled conduit may be disposed within a bore formed in the center pole 63. Pump 51 (shown in FIG. 3A) may circulate cooling fluid through the conduit 61 in the center pole and a heat exchanger 55 to transfer heat away from the center pole.

A cooling system may be an independent cooling system, or may be part of a cooling system already present in the application in which the actuator is used. For example, if an actuator is used to control an intake, exhaust or fuel injection valve in an internal combustion engine, the engine may be designed such that the cooling system also cools the actuator by, for example, circulating cooling fluid through a cooling jacket and/or a conduit disposed in the center pole. By cooling the actuator with the engine's cooling system, there is no need for a separate heat exchanger or pump. However, in some applications, it may be desirable to have greater control over the temperature of the actuator and, thus an independent cooling system may be employed for one or more actuators. For example, individual actuators may have their own independent systems, or the same cooling fluid may flow through multiple actuators, which connect to a central heat exchanger.

For an on-engine application, it is desirable to thermally isolate the actuator from the engine block to the actuator in order to heat exchange from the engine block to the actuator. In this regard, a thermal insulator formed from a low thermal conductivity material such as a ceramic or high-temperature plastic may be placed between the actuator and the engine block.

It is also desirable to thermally isolate the valve stem (which is exposed to combustion in the engine's cylinders) from the remainder of actuator. In this regard, the valve stem is preferably formed of a material having low thermal conductivity, such as titanium.

As shown in FIGS. 4A-4G, another embodiment features an actuator 60 that includes a stator assembly 62 having a coil assembly with three coils 64a-64c and an armature assembly 66 having three corresponding radially magnetized permanent magnets 68a-68c. The coils 64a-64c are configured such that adjacent coils will generate magnetic fields of opposite polarity. In this implementation, the coils 64a-64c are connected in series and the uppermost and lowermost coils, i.e., coils 64a and 64c, are wound in one direction (e.g., clockwise) and the coils located in the middle of the stator assembly, i.e., coils 64b, are wound in the opposite direction (e.g., counter-clockwise). Thus, when current is applied to the coils, adjacent coils generate magnetic fields having opposite polarities. The coils in this implementation are formed of round copper wire, however, other implementations may form the coils from conductive tape or wire having different cross-sectional areas or shapes.

The magnets 66a-66c of the armature assembly 64 are configured such that adjacent magnets have opposite radial magnetization. In other words, the uppermost and lowermost magnets, i.e., 66a and 66c, have a first radial polarization (e.g., north-south) whereas the magnet located in the middle of the armature assembly, i.e., magnet 66b, has an opposite radial polarization (e.g., south-north). In this implementation, the actuator 60 uses an overhung design in which the axial height of the magnets, 66a-66c, is larger than the axial height of the corresponding coils, 64a-64c.

Figures 4A, 4B:
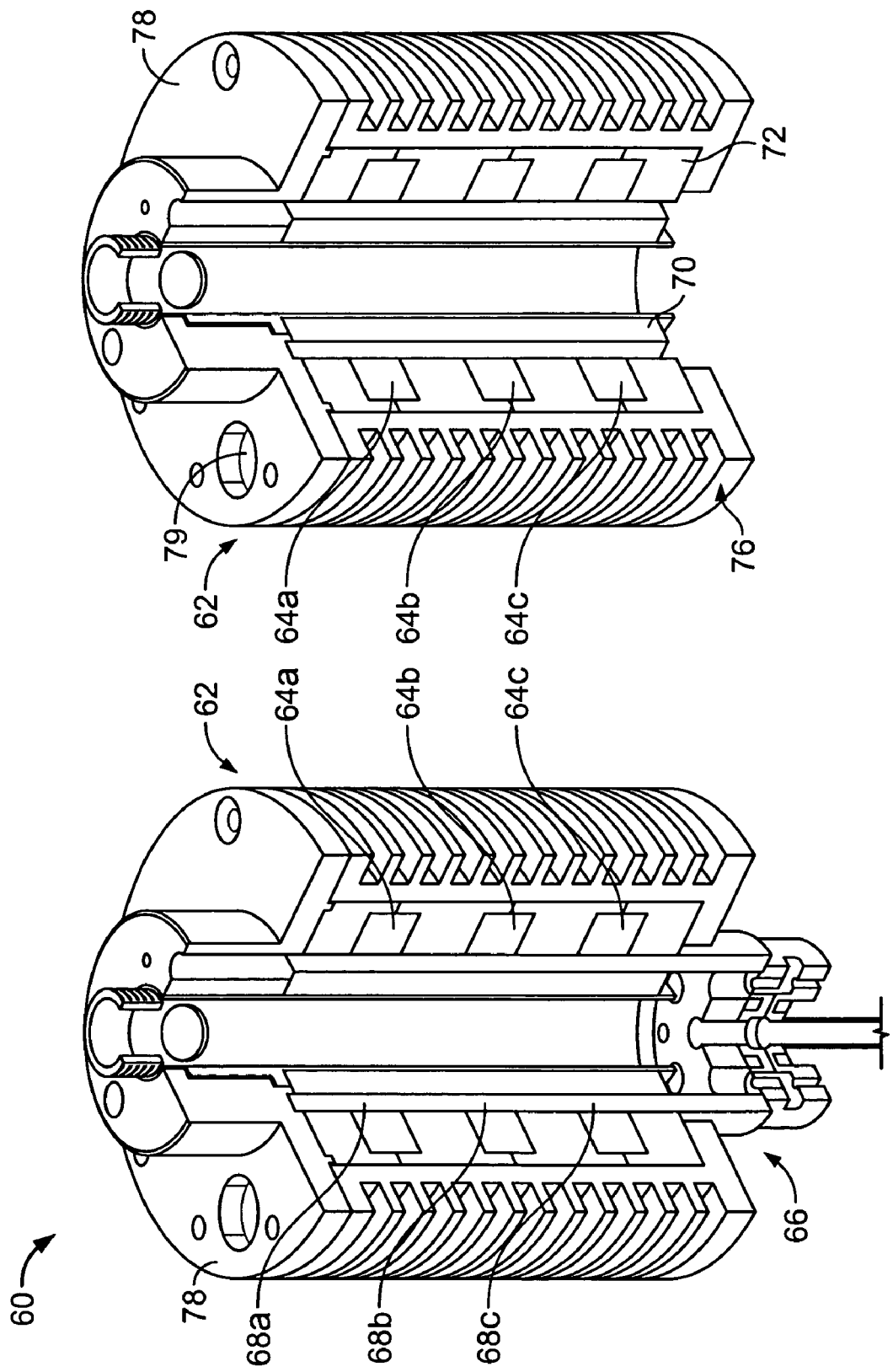
FIGS. 4A-4I are diagrams of another electromagnetic actuator.

Referring to FIG. 4B, the stator assembly 62, in addition to including the three coils 66a-66c, also includes a center pole 70 and a series of interlocking back iron members 72. The center pole 70 is formed of a material having high magnetic permeability (e.g., SMC) and functions as a magnetic return path for the magnetic field generated by the coils.

The stator assembly also includes a finned housing 76 that secures the back iron members 72 in place, and a coupler 78 that secures the finned housing 76 to the center pole 70. Several screws disposed in holes 79 mechanically couple the finned housing 76 to the coupler 78. The finned housing is preferably made of a material having high thermal conductivity, such as aluminum, which helps to draw heat away from the back iron members 72 and coils 64a-64c. Air flow may be directed over the fins to help transfer heat away from the actuator 60.

Figure 4D:
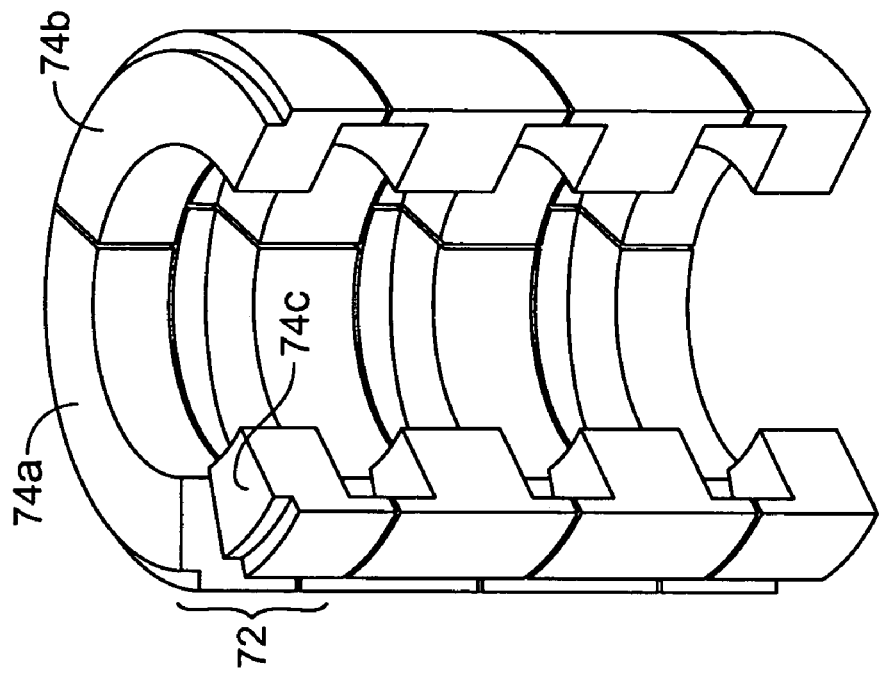
Figure 4C:
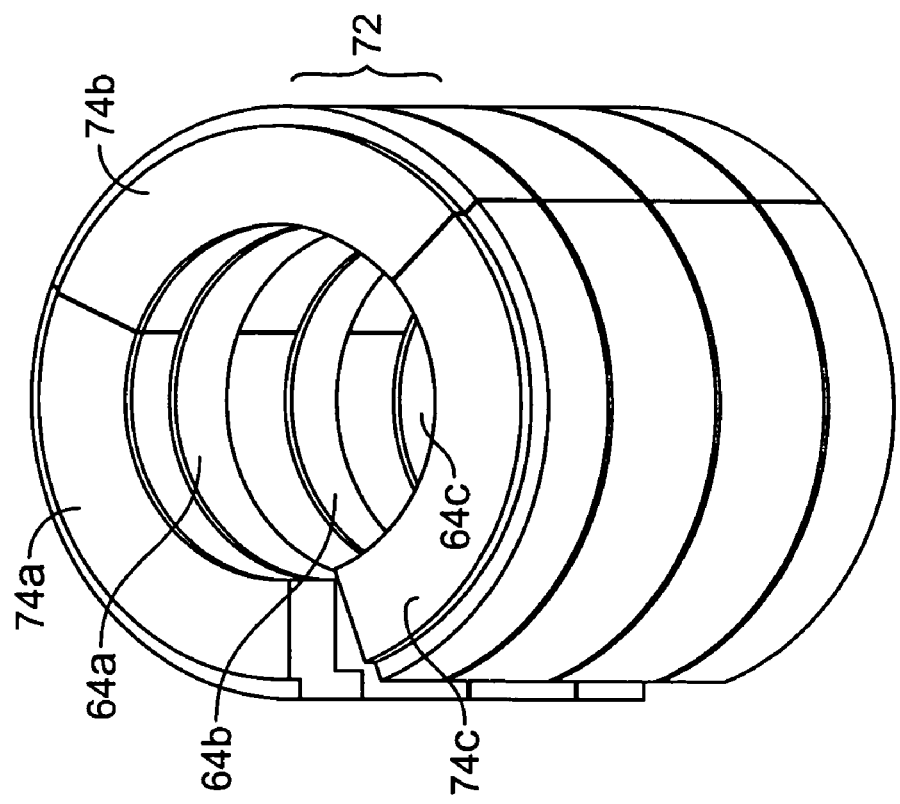

As shown in FIGS. 4C-4D, the adjacent back iron members 72 are formed of three arc segments, e.g., 74a-74c, that advantageously interrupt the dominate eddy current path and thus reduce dynamic losses. In this implementation, the center pole 70 and back iron members 72 are formed of powdered metal Soft Magnetic Composite (SMC) material (such as SM2 or SM3 made by Mii Technologies, LLC, headquartered at West Lebanon, N.H., or Somaloy 500 made by Hoganas, headquartered at Hoganas, Sweden). Other implementations may form the center pole and back iron members from other materials having high magnetic permeability, and preferably, high electrical resistivity.

Figure 4E:
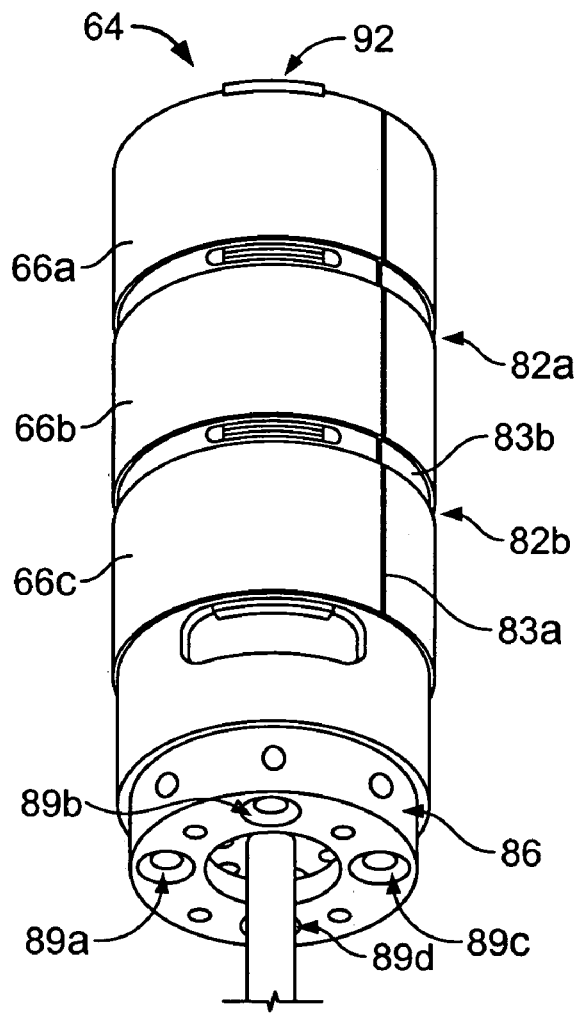
Figure 4F:
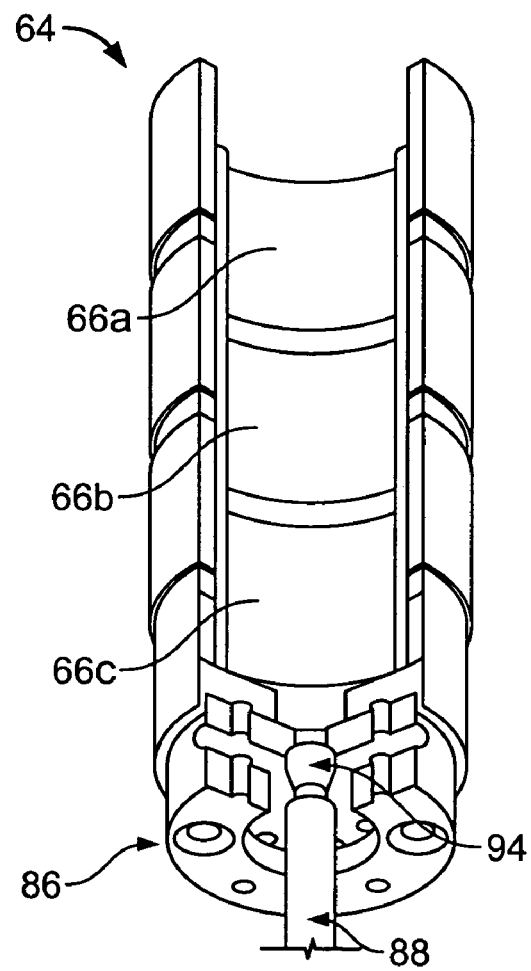

As shown in FIGS. 4E-4F, the armature assembly 64 includes two spacers 82a-82b disposed between the three radially magnetized magnets 66a-66c. The armature assembly also includes a ball joint assembly 86 that mechanically connects a valve stem 88 to the remainder of the armature assembly. A series of screws disposed in holes 89a-89d secures the ball joint assembly 86 to a coupler 90. One or more clips, e.g., clip 92, mechanically secures the magnets 66a-66c and spacers 82a-82b to the coupler 90. The magnets 66a-66c and spacers 82a-82b are split 83a, 83b in their axial direction to interrupt the dominant eddy current path.

Referring to FIG. 4F, the valve stem 88 includes a ball 94 at one end that is secured within the ball joint assembly 86 such that the valve stem is secured along the longitudinal axis of the armature assembly, but is free to move in other directions.

Figure 4G:
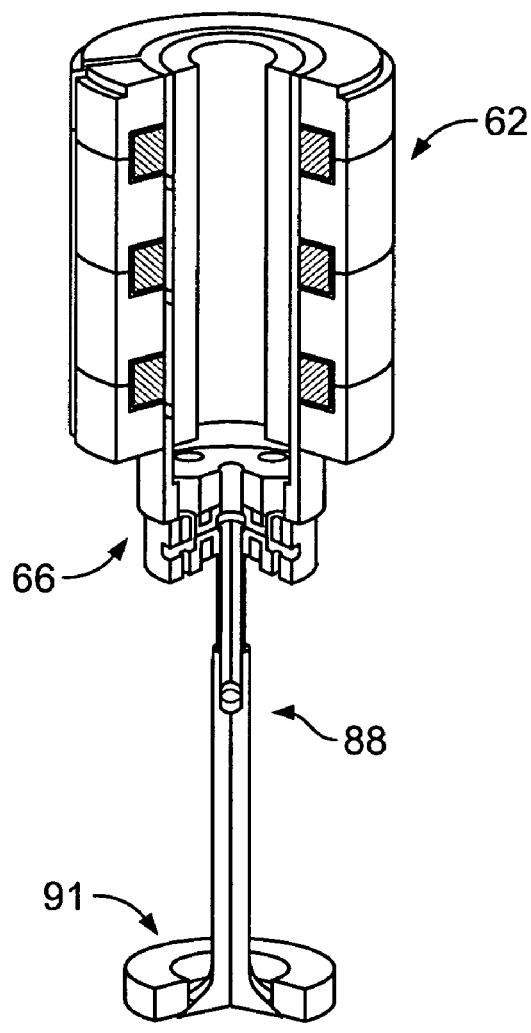
Figure 4H:
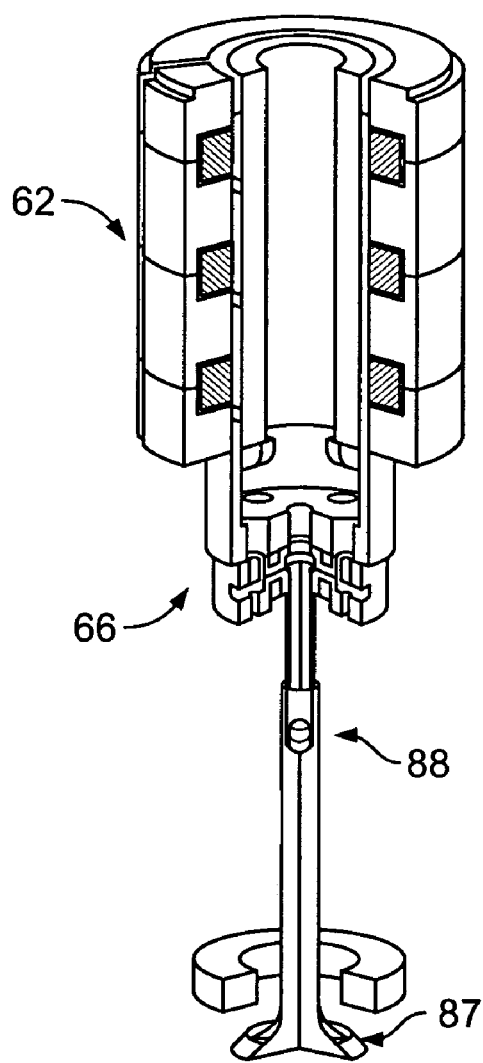

When current is applied to the coils, the magnetic field produced by the coils causes the armature assembly to move, in an upward or downward direction. As shown in FIG. 4H, when current flows through the coils in one direction, the armature assembly 66 moves downward, causing the valve stem 88 to pushes the valve 87 to a fully opened position. Similarly, as shown in FIG. 4G, when current is reversed, the armature assembly 66 is pulled upwards, causing the valve stem 88 to pull the valve against the valve seat 91, thus closing the valve. Note that in this implementation, the center pole does not act as a guide for the valve stem.

Figure 4I:
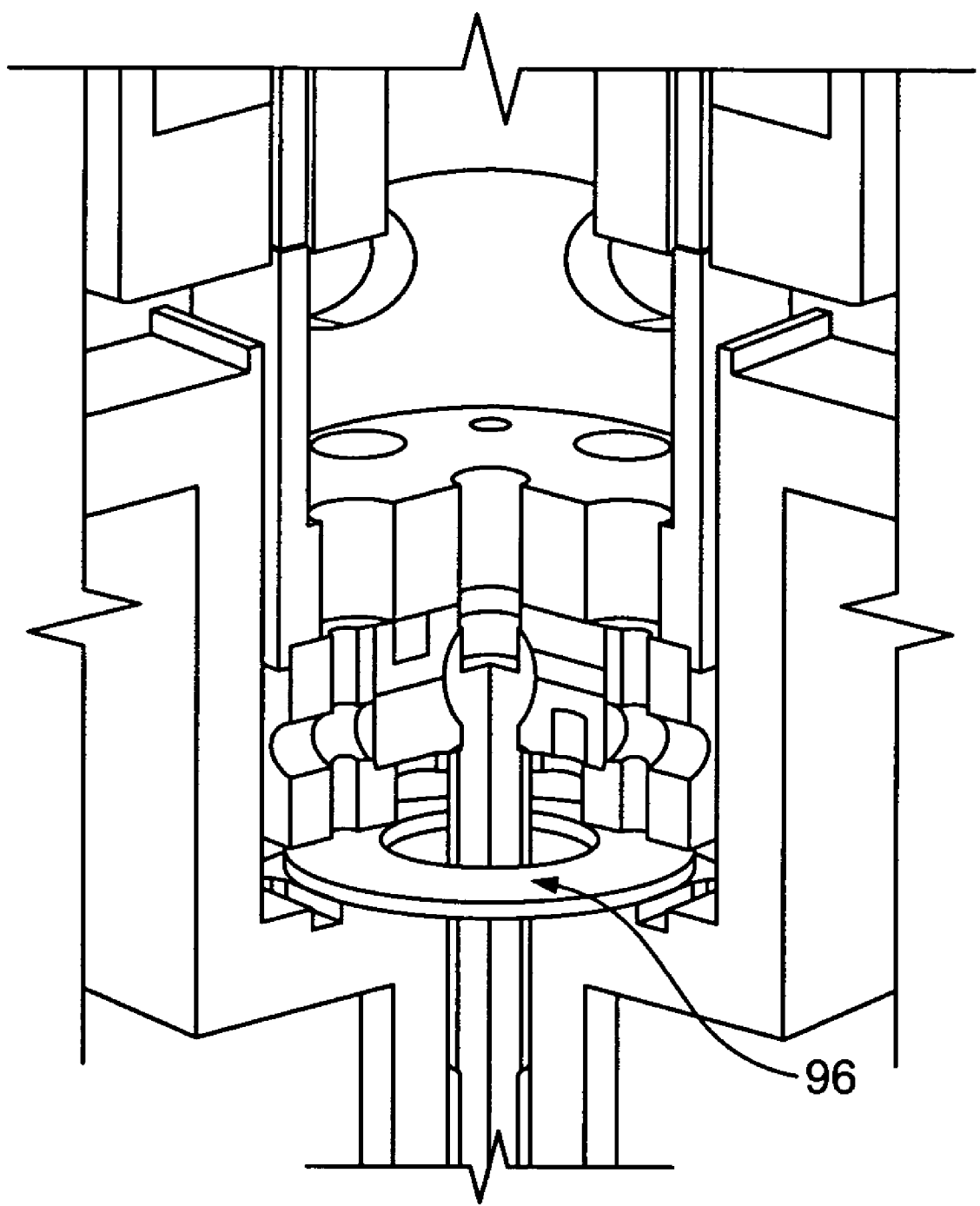

As shown in FIG. 4I, a spacer 96 is disposed within the center pole 70 to limit the excursion range of the armature. In this implementation, the spacer 96 is a Belleville spring washer, however other implementation may use springs or elastomeric or polymeric elements to limit the range of travel of the armature. In an on engine application, limiting the peak excursion of the armature may be desired to avoid interference between a piston and a valve controlled by the actuator.

Maximum displacement, the force versus displacement profile and detent force profile of the actuator is achieved by selecting appropriate design parameters such as the coil topology, relative height and positional relationship of magnets and coils, back iron and center pole dimensions and materials, and coil materials. Additionally, operation of the actuators may be controlled through the magnitude, duration and polarity of current applied to the coils, thus permitting flexible control of the valve's operating parameters such as the valve lift (i.e., the amount the valve is open) and valve timing (i.e., the opening and closing points of the intake and exhaust valves with relation to the crankshaft position).

In one embodiment, an actuator may employ an underhung magnet design in which the axial height of the coils is larger than the height of the magnets. In one specific underhung magnet design using four coils and four magnets, each turn of the coil is made of copper. Each coil occupies a volume bounded by inner (ID) and outer diameters (OD) of 1.56 inches and 2.03 inches, respectively, and a height of 0.7 inches. The ratio of magnet height to the radius of the magnet cross section is about 3.6:1 with inner and outer diameters of 1.31 inches and 1.53 inches, respectively, with a height of 0.4 inches. Each magnet is formed of NdFeB (specifically, Nd HS35AR made by Hitachi Magnetics Corporation, headquartered at Edmore, Mich.) and has a mass of roughly 25 g.

In another embodiment, an actuator may employ an overhung magnet design in which the axial height of the coils is less than the height of the magnets. In one implementation, an actuator uses an overhung magnet design with three copper coils and three magnets. Each of the coils has inner and outer diameters of 1.48 inches and 2.28 inches respectively, and a height of 0.4 inches. Each of the magnets has inner and outer diameters of 1.24 inches and 1.44 inches respectively and a height of 0.8 inches. The ratio of magnet height to the radius of the magnet cross section width is 8.1:1. Each magnet is formed of NdFeB (specifically, Nd HS30FR made by Hitachi Magnetics Corporation, headquartered at Edmore, Mich.) and has a mass of about 39 g.

Figure 5A:
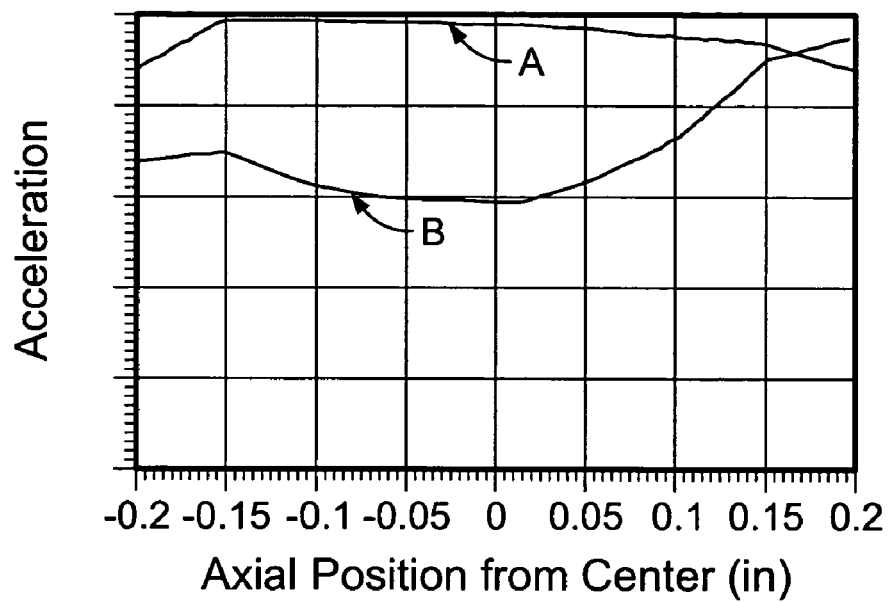
FIG. 5A is a graph illustrating simulated acceleration vs. position profile for an overhung and underhung magnet design.

One way to assess the performance of an actuator design is to plot acceleration versus displacement of an actuator. The acceleration is the normalized force per unit moving mass, defined as magnetostatic force/moving mass (where moving mass is made up of the magnet mass plus approximately 100 grams of parasitic mass in an exemplary embodiment). Parasitic mass refers to any non-force producing moving mass (i.e. any portion of the moving mass in the exemplary embodiment that is not permanent magnet material) such as the valve, magnet spacers, coupler, ball joint assembly, sensors, etc. FIG. 5A plots the acceleration versus displacement profile of simulated actuator having the overhung (line A) and underhung (line B) designs described above using Maxwell® v.9.0.19 available through ANSOFT Corporation (www.ansoft.com). The simulation results shows that the overhung design has an approximately linear acceleration over an intended excursion range of between −0.15 inches and +0.15 inches from center. The horizontal axis represents the range of positions from valve fully closed (−0.2 in) to valve fully open (0.2 in).

Figure 5B:
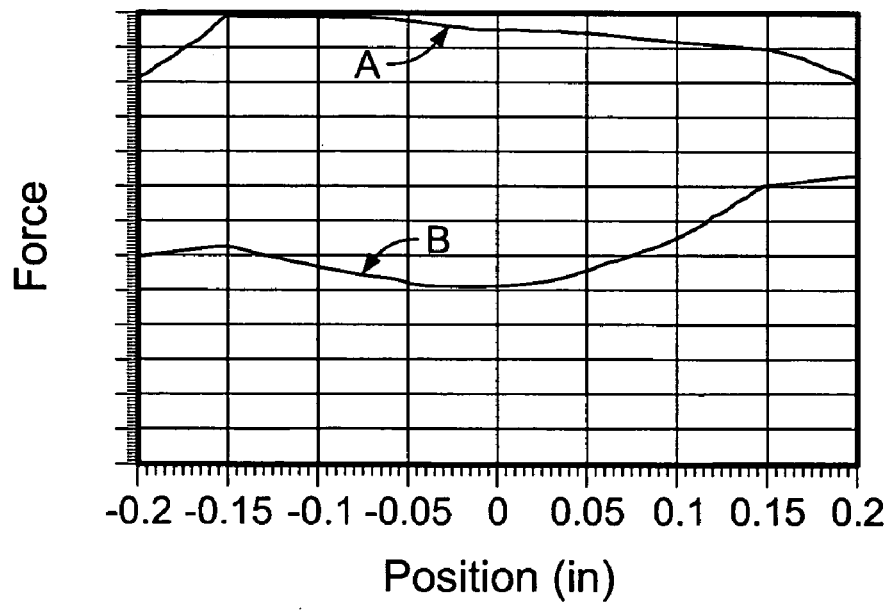
FIG. 5B is a graph illustrating simulated force vs. position profiles for an overhung and underhung magnet design.

FIG. 5B shows simulated force versus displacement profiles for the exemplary overhung (line A) and underhung (line B) designs described above using, also using ANSOFT's Maxwell® v.9.0.19 software. The force variation shown for the overhung design is substantially constant, over an intended excursion range between −0.15 inches and +0.15 inches from center, which is 75% of the maximum range of travel.

A substantially constant force output and acceleration over the intended excursion range is advantageous because it simplifies the control scheme needed to control actuator displacement and enables variable lift, which can be particularly useful when actuators are used to actuate the intake and exhaust valves in an internal combustion engine.

Referring back to FIG. 2A, a detent force results from the magnetic attraction between the ferrous elements of the stator, such as the back iron members 24 and center pole 28, and the magnets 32, 34 in the armature assembly when the stator is not energized. In a preferred embodiment, an actuator is configured such that when the armature assembly moves to the valve-fully-closed position, the detent force acts in the seating direction thus assisting to bring the valve 37 (shown in FIGS. 2G-2H) to its seat. In such an embodiment, the detent force is also advantageously used to keep the valve closed after it is seated. By using the detent force as a biasing force, a control system preferably does not need to supply current to the coils to keep the valve closed, which, in a four-cycle internal combustion automobile engine is approximately two-thirds of the cycle time.

Figure 5C:
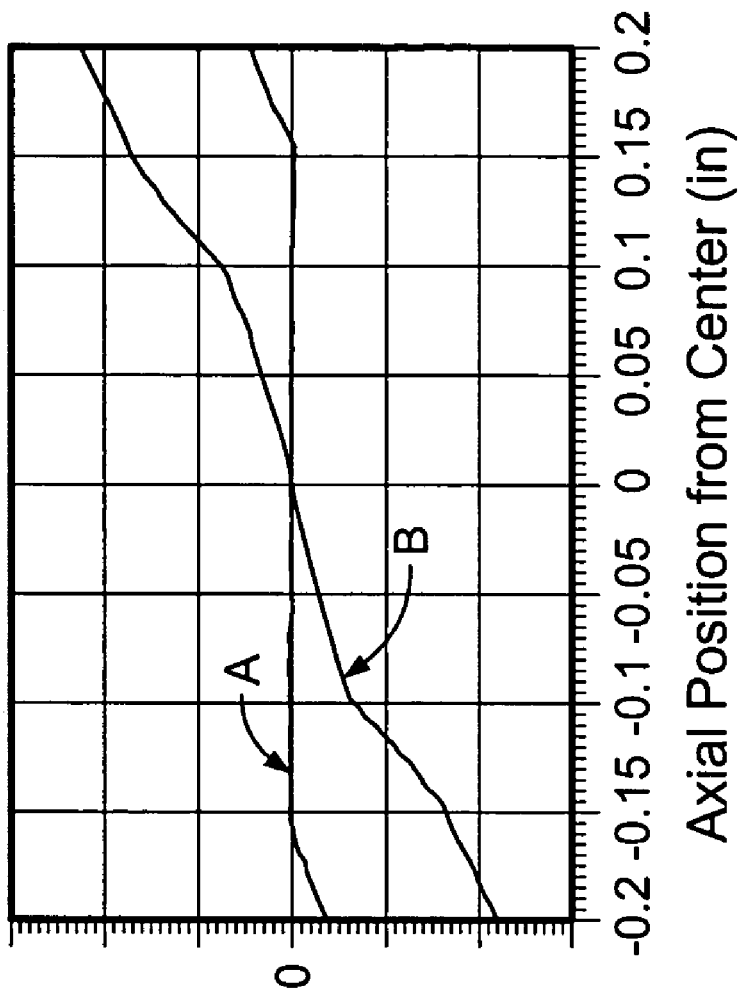
FIG. 5C is a graph illustrating simulated detent force characteristics for an overhung and underhung magnet design.

FIG. 5C compares the detent force characteristics for the previously described underhung (line B) and overhung (line A) magnet designs. The underhung magnet design exhibits more substantial detent force at the extreme ends of travel (i.e., between −0.2 and −0.15 inches and between +0.15 and +0.2 inches), which aids the force output at one end of travel, but subtracts at the other end. The overhung magnet design exhibits the same trend with its detent force, but has a larger region of substantially zero detent force over the intended excursion range. The magnetic detent force profile of the actuator also depends on the selection of various design parameters such as coil materials, coil volume, magnet material, magnet volume, back iron material and construction, and center pole material and construction.

Figure 6:
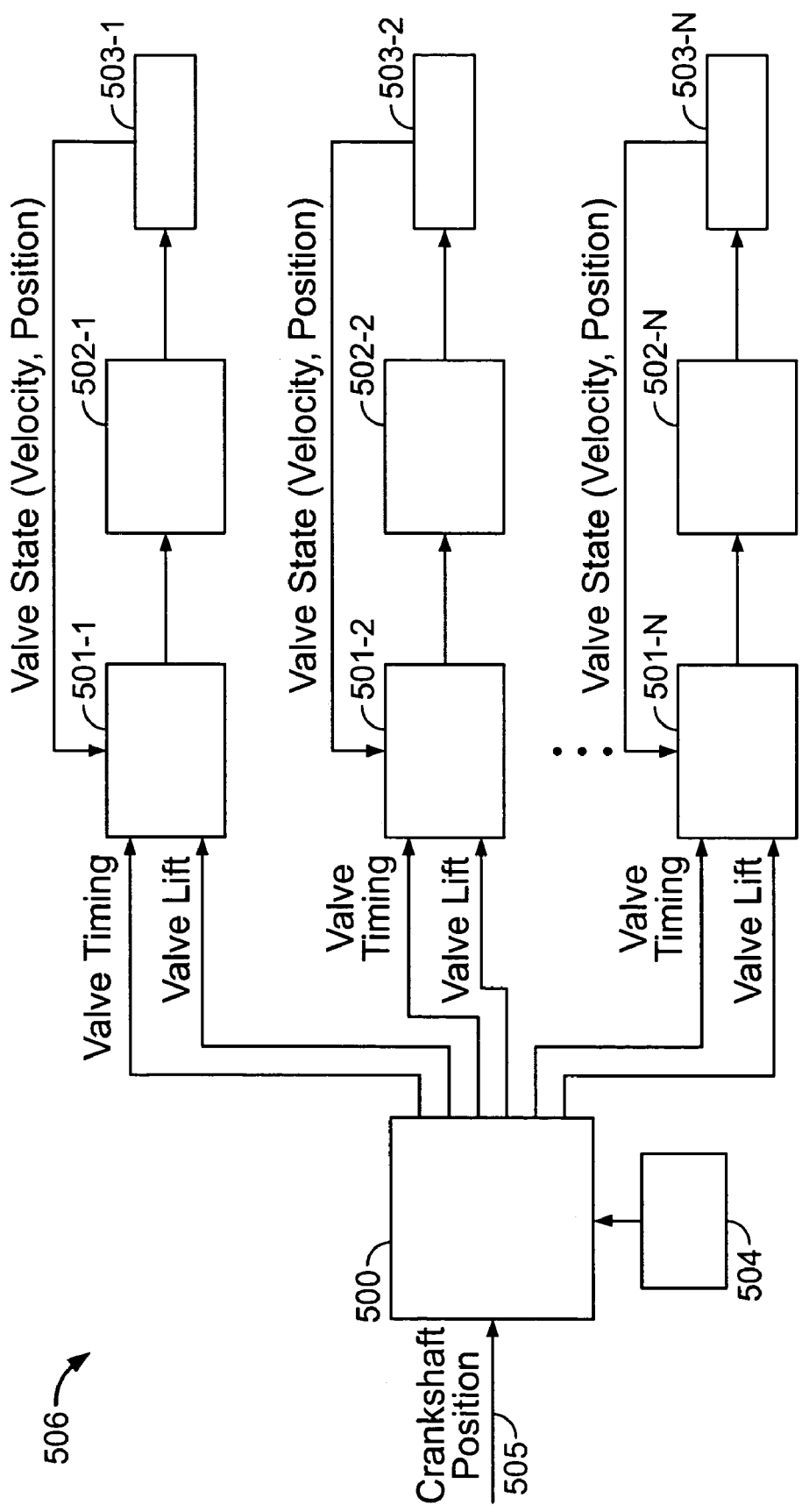
FIG. 6 is a diagram of a control system for electromagnetic actuators.

Referring to FIG. 6, a control system 506 for controlling a plurality of intake and exhaust valve actuators in an internal combustion automobile engine includes an upstream control processor 500, and a series of downstream control processors 501-503 that are each dedicated to a particular intake or exhaust valve.

Upstream control processor 500 receives crankshaft position information 505 (which may be fed from an optical encoder or other device that tracks crankshaft position) and control instructions from a central controller, such as an electrical engine control unit (ECU) 504. The upstream processor uses this received information to generate and transmit to the downstream processors 501-1, 501-2 . . . 501-N signals that indicate the valve timing (i.e., the opening and closing points of the intake and exhaust valves with respect to the crankshaft position) and valve lift (i.e., the amount the valve is open) for each of the controlled valves.

As described more fully in the patent application titled "Controlled Starting and Braking of an Internal Combustion Engine" by David Hanson, Jun Ma, Benjamin G. K. Peterson, and Geoffrey Coolidge Chick, filed concurrently with this disclosure, the valve timing and valve lift parameters for specific operating modes (e.g., the self-starting or engine braking modes are described in the above references application) may be determined dynamically through a closed-form calculation. Alternatively, the valve parameters may be determined statically through use of a look-up table where pre-calculated valve timing and valve lift parameters corresponding to different operating modes have been stored in memory. In the static implementation, the upstream processor 500 searches through a set of pre-calculated look-up tables corresponding to the different operating modes based on instructions received from ECU 504.

The downstream control processors 501 receive a valve control signals from the upstream processor, which may be in a variety of forms such as a digital pulse. In response to receiving a valve control signal from the upstream processor, the downstream control processor issues a voltage signal to a voltage controlled pulse-width modulated (PWM) power module 502 to produce an output driving current of a certain magnitude and polarity. The PWM power module 502 then supplies the current signal to the coils of the valve actuator 503. The magnitude and polarity of applied current determine the opening and closing behavior of the intake or exhaust valve actuator 503. Downstream control processors (e.g. 501-1 for valve actuator 503-1) control also receive feedback information on one or more operating states of the valve (i.e., acceleration, velocity, and/or position) and adjust the control signal to the PWM based on the current valve state information.

Valve states can be monitored via one or more sensors mounted on the valve and/or actuator. For example, valve actuator velocity (V) and displacement (lifting, L) can be determined by a positional sensor such as an optical encoder. The sensor may measure velocity or displacement directly and calculate the other quantity as needed using a differentiator or integrator to determine the other quantity. In the one implementation, a Linear Velocity Transducer (LVT) is used to measure velocity directly, and is mounted on the top of the armature. Alternatively, an accelerometer could be used.

It should be understood that processors such as 500 and 501-1 are functional blocks which may reside in one or more physical modules and may be in the form of hardware, software or any combination of hardware and software, or in analog or digital form.

Figure 7:
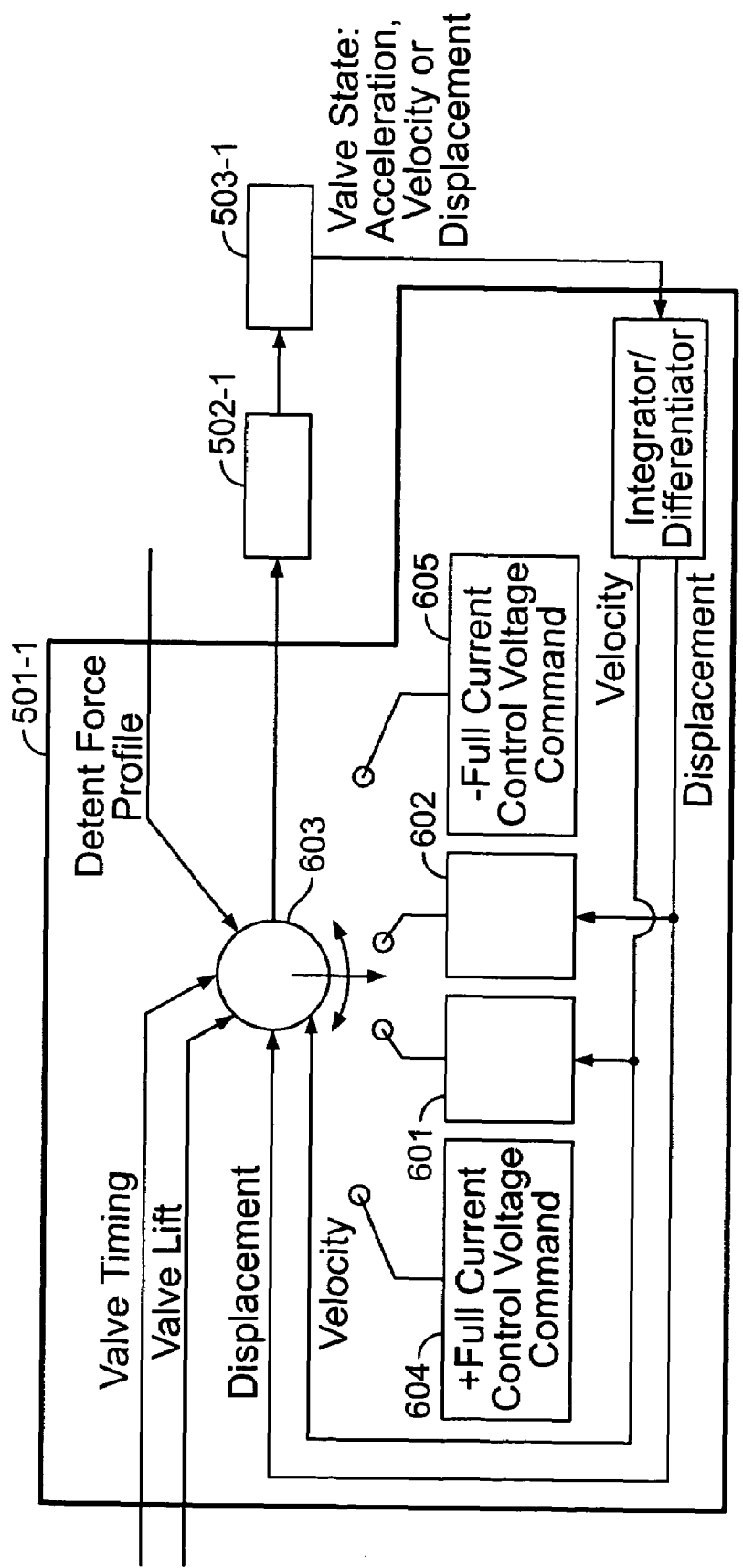
FIG. 7 is a block diagram for a closed-loop control system for an electromagnetic actuator.

As said, downstream processors (e.g. 501-1) control the dynamics of each individual valve by controlling the magnitude and polarity of current applied to the actuator. There are many ways of implementing such a control strategy. FIG. 7 shows one embodiment of a feedback based control strategy to implement the function of downstream processor 501-1.

As shown in FIG. 7, the downstream processor 501-1 can issue voltage commands 604 and 605 to the PWM power module that would cause the PWM module to provide full current (positive or negative) to the actuators. Input voltage commands 604 and 605 are synchronized with the rising or falling edge of a valve timing signal received from the upstream controller, which triggers valve opening or closing. The downstream processor also includes a velocity feedback loop 601 that controls the velocity of the armature (typically used in a negative feedback mode to reduce the velocity of the armature), and a position servo (displacement) feedback loop 602 that fine-tunes the valve displacement to a desired position. The downstream controller also includes a switching mechanism 603 that receives the valve lift and timing instructions from the upstream processor as well as valve state information. The switching mechanism uses this information, as well as the detent force profile of the actuator (which is stored in the memory associated with the processor) to selectively activate and deactivate positive or negative full current commands, the velocity feedback loop and the position servo (displacement) feedback loop, to control valve opening and closing.

Figure 8:
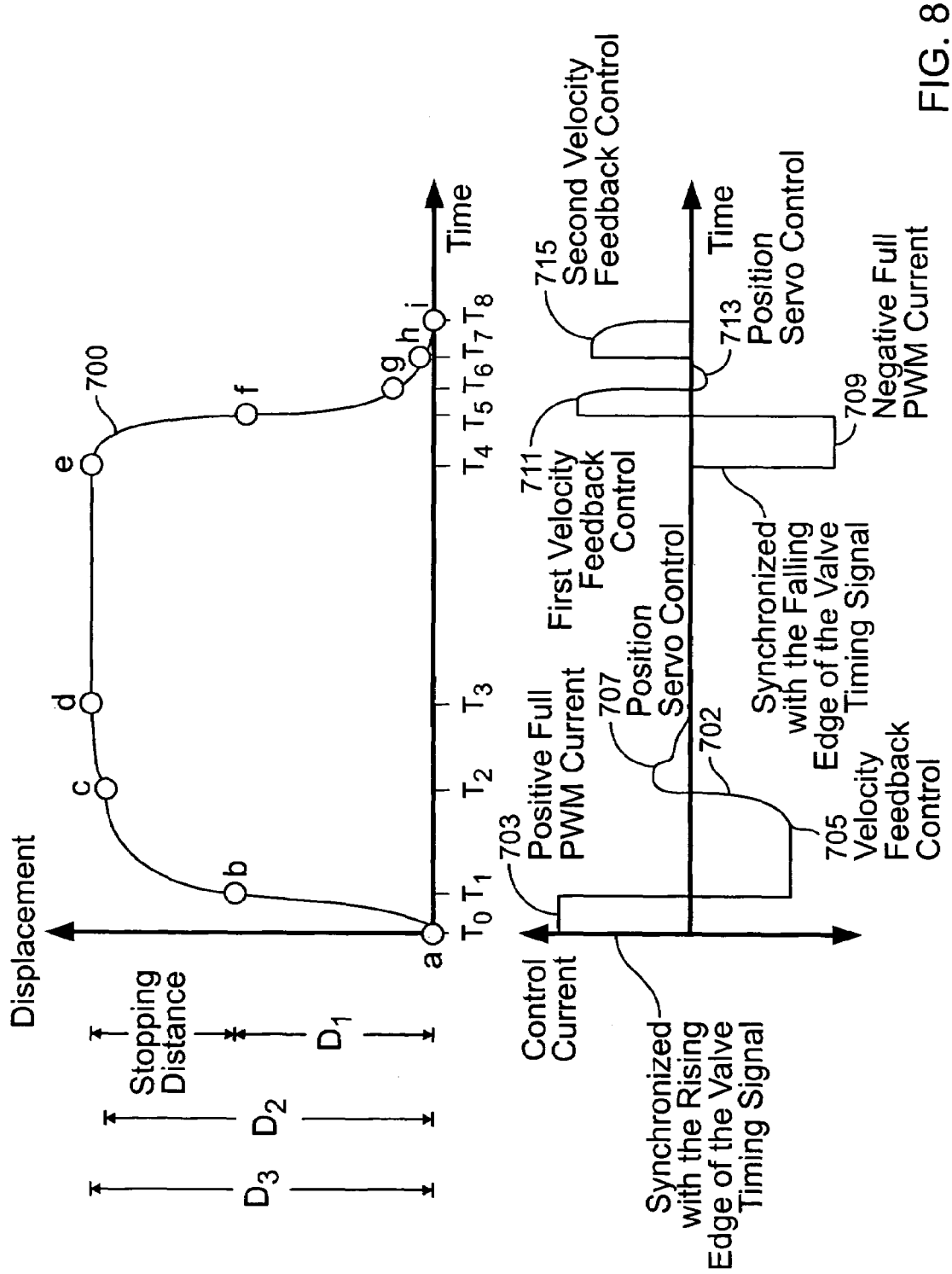
FIG. 8 are two graphs showing the relationship between control current applied to a set of stator coils and the displacement of an armature in one embodiment of an electromagnetic actuator.

Referring to FIG. 8, valve displacement (graph 700) and a corresponding current control signal (graph 702) are plotted as a function of time using the exemplary control system described in FIGS. 6-7.

When a downstream processor senses the rising edge of a valve control signal received from the upstream processor at time T(0), it triggers the valve actuator to open by issuing a full positive current control voltage command 703 to PWM power module 502-1 (identified as point (a) in FIG. 8). When the armature reaches a point where the distance D(1) and velocity satisfy a predetermined equation, which occurs at time T(1), switching mechanism 603 of the downstream processor switches to introduce negative velocity feedback signal 705 (and disables the positive full current command) which introduces a control current signal with reverse polarity to slow the armature down. The predetermined equation relationship between valve velocity V(1) (at time T(1) before activating negative velocity feedback) and stopping distance (which is defined as the displacement difference between valve lift D(1) at time T(1) and the desired displacement position D(3) at time T(3)), can be represented approximately as a linear relationship (ignoring factors such as engine chamber pressure). Based on V(1), D(1), D(3) and the linear relationship, the negative velocity feedback loop 601 can be selectively activated and timely controlled via switching mechanism 603 to stop the valve at time T(2).

Ideally point (c) will match point (d). That is, at time T(2) the valve will have stopped exactly at a desired position. However, in real applications, the physical plant changes from time to time, and valve dynamics are influenced by disturbances associated with cylinder respiration. As a result of the disturbances, the armature may slow to a stop at a location (c) which is close to the desired location (d) but may not be exactly at position (d), as the magnitude of the applied control current is reduced to zero (by the negative velocity feedback loop). The servo displacement loop 602 is then selectively activated by the switching mechanism 603 to replace the velocity feedback loop. The position servo control generates a current signal for fine-tuning valve position, to accurately push the valve to the desired position (d) at time T(3). It will also maintain its position there until a valve landing signal is received. In the illustrated example, the desired displacement position is the expected valve lift. It should be noted that the expected displacement position could be less than the maximum lift (for example, ⅔ of the maximum lift). D(2), which is the displacement at time T(2), may be larger or smaller than D(3) (the desired displacement) after the velocity feedback loop is deactivated and there may be small oscillations during the course of settling from point (c) to point (d). The corresponding position servo control current may also oscillate between positive and negative values. The exact behavior depends on the dynamics of the position servo control loop.

For a valve closing event, it is desirable to avoid a hard landing, which may shorten a valve's life and generate unwanted noise. It is preferable to achieve a valve landing speed less than 0.2 m/s. The detent force profile as a function of armature position is an actuator design parameter that can be altered by varying design aspects of the actuator, and needs to be taken into account when constructing a system to land a valve with a certain velocity. For example, in the exemplary overhung actuator design shown in FIG. 5B, the actuator is constructed such that detent force is substantially zero during most of the excursion range, and only starts taking effect when the armature is close to its fully open (VFO) or fully closed (VFC) positions. When the valve (armature) is close to the VFC position, the detent force acts to hold the valve in a closed position. The control current can be appropriately controlled (e.g., using velocity feedback) to provide a force opposite to the detent force, to soft-seat the closure and help achieve a desired valve landing velocity.

Referring again to FIG. 8, when the falling edge of the valve control signal is sensed by the downstream processor, it triggers the valve actuator to close at time T(4). In this regard, switching mechanism 603 connects negative current control command 605 to PWM power module 502-1. The input voltage command 605 is synchronized with the falling edge of the valve timing signal, and causes the PWM power module to provide negative full current to the actuator, which causes the armature to move towards a closed position. When the armature reaches a point where its distance and velocity satisfy a predetermined relationship at time T(5), switch mechanism 603 disables the negative full current command and connects negative velocity feedback 601. Negative velocity feedback generates a control current signal which in turn causes PWM power module to apply a current to the actuator with reverse polarity relative to the current that was applied to move the valve towards its closed position, to reduce the velocity of the armature. The armature slows to a stop at its approximate desired displacement location (location (g) in this example) at time T(6), as the magnitude of the applied control current is reduced to zero. At this time, similar to the case of a valve opening event, a position servo control is activated (at time T(7)) to generate a current signal for fine-tuning the valve position, to try to accurately land the valve at the desired position (i). But different from a valve opening event, the position servo control for valve closing is deactivated when the valve is very close (h) to the desired position, where the detent force starts to take effect (for example, when the valve is at −0.15 in position in FIG. 5B for the underhung design).

At this point, switch mechanism 603 again applies velocity feedback control. Velocity feedback is used to control the valve velocity when it is under the influence of detent forces. This ensures that the valve can be made to land with a desired velocity. The actual landing velocity can be controlled by adjusting parameters of the velocity feedback loop (by adding a constant offset, for example). The nature of negative velocity feedback loop helps overcome the velocity fluctuations to maintain an approximately constant landing velocity, until the valve actually lands at the desired position (i) at time T(8). Furthermore, for the exemplary detent force profile, the detent force will hold the valve closed, without supplying additional control current once the valve has landed, to further provide power savings. It should be noted that depending on the detent force profile, the detent force may not be sufficient to hold the valve closed. In such a case, extra current may have to be supplied to hold the valve closed.

It should be understood that a number of different operating conditions (such as a, b, c, d and T(0), T(1), T(2), T(3) etc. as shown in FIG. 8) could be defined for more sophisticated actuator control.

Other control strategies, which combine use of a velocity feedback loop to reduce valve speed, and a displacement loop for fine control of positioning, and that exploit of detent forces to save energy, are possible. Performance criteria, such as rise time, overshoot, steady-state error and settling time, may be reasonably met by modifying controller design and selection, including use of different controller structures such as PID, phase-lead, or phase-lag. More complicated controllers such as a nonlinear dynamic controller or machine-learning based controllers (e.g. neural network or fuzzy logic based controllers) may also be utilized.

A number of embodiments of the invention have been described. Nevertheless, it will be understood that various modifications may be made without departing from the spirit and scope of the invention. For example, the actuator does not have to be cylindrical on a plane around the center axis, it could, instead, be a quadrilateral or a shape without planar symmetry around the center axis. Similarly, the displacement provided by the actuator does not have to be useful in a direction parallel to the center axis, but the displacement could be translated to other directions. Specific numbers, arrangements and magnetization of parts in all embodiments shown could also be modified. Additionally, an electromagnetic actuator designed in accordance with this description may be used in a wide variety of application where linear actuation is desired and is not limited to engine valve control.

Accordingly, other embodiments are within the scope of the following claims.

What is claimed is:

1. An electromagnetic actuator, comprising:
a stator assembly having an inner surface that defines an opening, the stator assembly comprising:
a coiled conductor disposed near the inner surface of the stator assembly and adapted to generate a first magnetic field when current is applied;
a center pole formed of a material having high magnetic permeability, having a longitudinal axis, and defining a channel configured to circulate cooling fluid; and
an armature assembly at least partially disposed within the stator assembly opening, the armature assembly comprising:
a permanent magnet, wherein the armature assembly is configured to move in a direction parallel to the longitudinal axis of the center pole when current is applied to the coiled conductor.

2. An internal combustion engine comprising:
a cylinder that defines a chamber;
a valve adapted to control the flow of a liquid or a gas into or out of the chamber; and
an electromagnetic actuator coupled to the valve, the actuator comprising:
a stator assembly comprising:
a coiled conductor adapted to generate a first magnetic field when current is applied;
a center pole formed of a material having high magnetic permeability and having a longitudinal axis and a channel; and
an armature assembly at least partially disposed within the stator assembly opening, the armature assembly comprising:
a permanent magnet, wherein the armature assembly is configured to move to open or close the valve when current is applied to the coiled conductor,
a cooling circuit comprising:
a heat exchanger; and
a pump configured to circulate cooling fluid between the electromagnetic actuator and the heat exchanger through the channel in the center pole.

* * * * *